(12) United States Patent
Rowland et al.

(10) Patent No.: US 7,058,968 B2
(45) Date of Patent: Jun. 6, 2006

(54) COMPUTER SECURITY AND MANAGEMENT SYSTEM

(75) Inventors: Craig H. Rowland, Austin, TX (US); Justin Pettit, Campbell, CA (US); Aaron Rhodes, Clyde, OH (US); Vicki Irwin, Cedar Park, TX (US)

(73) Assignee: Cisco Technology, Inc., San Jose, CA (US)

( * ) Notice: Subject to any disclaimer, the term of this patent is extended or adjusted under 35 U.S.C. 154(b) by 899 days.

(21) Appl. No.: 09/683,507

(22) Filed: Jan. 10, 2002

(65) Prior Publication Data

US 2002/0129264 A1  Sep. 12, 2002

Related U.S. Application Data

(60) Provisional application No. 60/261,155, filed on Jan. 10, 2001.

(51) Int. Cl.
*G06F 11/30* (2006.01)
*G06F 9/44* (2006.01)
*G06F 17/00* (2006.01)
*H04L 9/32* (2006.01)

(52) U.S. Cl. .......................... 726/1; 726/22; 719/318; 719/328; 713/168; 713/176

(58) Field of Classification Search ..................... None
See application file for complete search history.

(56) References Cited

U.S. PATENT DOCUMENTS 6,088,804 A     7/2000  Hill et al. .................... 713/201
6,311,274 B1 *  10/2001 Day ............................ 726/22

FOREIGN PATENT DOCUMENTS

WO    WO 99/57625    11/1999
WO    WO 03/029934 A1    4/2003

OTHER PUBLICATIONS

Supplementary European Search Report in European Application No. EP 02705761, dated Oct. 21, 2004, 3 pages.
Hervé Debar et al., "A revised taxonomy for intrusion-detection systems," XP-000954771, *Ann. Télécommun.* 2000, pp. 361-378.
Jansen, Mell, Karygiannis, Marks, Mobile Agents in Intrusion Detection and Response, (12th Annual Canadian Information Technology Security Symposium) Jun. 2000.
Balasubramaniyan et al., "An Architecture for Intrusion Detection Using Autonomous Agents," *Purdue University* supported by contract from *Maryland Procurement Office* and by sponsors of the *COAST Laboratory*, Dec. 1998, 12 pages.
Jansen et al., "Applying Mobile Agents to Intrusion Detection and Response," *National Institute of Standards and Technology Computer Security Division*, Oct. 1999, 49 pages.
International Search Report in International Application No. PCT/US02/00900, dated Sep. 5, 2003, 5 pages.

* cited by examiner

*Primary Examiner*—Christopher Revak
(74) *Attorney, Agent, or Firm*—Baker Botts L.L.P.

(57) ABSTRACT

The present invention provides a generic distributed command, control, and communication framework that allows computer systems, devices, and operational personnel to interact with the network as a unified entity. The present invention provides these services by building upon a core communication architecture that permits local or remote execution of mobile program code, static execution of program code, flexible communication formats, self-healing network techniques, and expansion by the addition of new system modules, software handlers, or mobile autonomous agents.

49 Claims, 14 Drawing Sheets

COMPUTER SECURITY AND MANAGEMENT SYSTEM

CROSS REFERENCE TO RELATED APPLICATIONS

Referenced-Applications

This application claims benefit of U.S. Provisional Application No. 60/261,155, filed on Jan. 10, 2001.

BACKGROUND OF INVENTION

The invention relates generally to distributed intrusion detection, network management and host management systems. More particularly, it relates to autonomous self-healing computer network and computer management tools for computer security that operate in a distributed and localized manner.

The increased use of the Internet, intranets and extranets for gaining access to computer systems and networks has led to a commensurate increase in unauthorized access or attempted access into these systems and networks. This activity is unauthorized whether or not its purpose is of a malicious nature. As a result, intrusion prevention, detection and correction technologies have taken on a more significant role in computer system and network security.

Most of the systems in use today to prevent and detect intrusions are applicable to centralized client-server networks. These intrusion prevention and detection systems do not have the capability to operate effectively over widely distributed networks and systems in a unified manner. Nor do they have the capability to isolate and repair network and system elements that have been maliciously altered. They are also unable to re-allocate resources to compensate for defective network and system elements. Operation of many of these intrusion detection systems is limited to automatically collecting and reducing data, while the analysis of that data usually remains a manual process. Profiling and pattern recognition techniques also have been used to analyze the data collected and presented to an intrusion detection system. Some intrusion detection systems, based on anomaly detection techniques, look for statistically anomalous behavior, that is, behavior that appears unusual when compared to other user behavior. These systems are prone to both false positive and false negative alerts, resulting in a slow or inadequate response to the intrusion. Some intrusion detection systems use expert systems, which are driven from an encoded rule base to monitor policy compliance to ensure that all users are operating within their privileged rights. Other systems have passive monitor functions that continually analyze data presented to them. Another type of intrusion detection system is a scanner that actively attempts to find security holes (called vulnerabilities) and unauthorized hardware and software. Relying on systems with these limited capabilities can result in financial loss and system damage to an organization.

It is desirable to provide a computer security and management system that enables a distributed framework for command, control and communication that enables systems, devices and operational personnel to interact with a network as a unified entity. It is further desirable to provide this command, control and communication by using a core communication architecture that allows local and remote execution of mobile program code, and static execution of program code. Such a system should enable flexible communication formats, self-healing network techniques, and expansion by adding new program modules, software handlers, and mobile autonomous agents.

SUMMARY OF INVENTION

The present invention provides a generic distributed command, control, and communication framework that allows computer systems, devices, and operational personnel to interact with a network as a unified entity. The present invention provides these services by building upon a core communication architecture that permits local or remote execution of mobile program code, dynamic and static execution of program code, flexible communication formats, self-healing network techniques, and expansion by the addition of new system modules, software handlers, or mobile autonomous agents.

The system components may comprise at least one client, at least one server, and at least one graphical user interface. These components may be interconnected by encrypted and authenticated communication links. They may be customized for site-specific requirements. The system components interact to isolate and process system status messages, security alarms, administrative tasks, mobile autonomous agent functions, self-healing network functions, and user-implemented modules. The clients and servers each contain a Master Control Process and associated system handlers. The Master Control Process provides a message routing function for transferring messages between the various handlers.

A computer implemented method having features of the present invention for providing system security and resource management comprises managing event messages by a master control processor between system handlers according to security system policies, processing network messages by a network handler between client and server computers, inserting native and third party event messages received by an insertion handler into the master control processor for processing by other system handlers, detecting and processing event message signatures by the signature handler from alarm, system, and insertion events for conversion into system alarm messages for action by the other system handlers, and performing actions by an action handler in response to action requests from the master control processor. The method may further comprise maintaining an execution environment by an agent handler for mobile autonomous code modules. The method may further comprise collecting and logging event messages by a logging handler. The method may further comprise managing system configuration parameters by a configuration handler.

In an alternate embodiment of the present invention, a system for providing system security and resource management comprises a master control processor for managing event messages between system handlers according to security system policies, a network handler for processing network messages between client and server computers, an insertion handler for inserting native and third party event messages into the master control processor for processing by other system handlers, a signature handler for detecting and processing event messages from alarm, system, and insertion events for conversion into system alarm messages for action by other system handlers, and an action handler for performing actions in response to action requests from the master control processor. The system may further comprise an agent handler for maintaining an execution environment for mobile autonomous code modules, a logging handler for collecting and logging event messages, and a configuration handler for managing system configuration parameters. The system may be installed on at least one server computer and at least one client computer. The system may further comprise at least one graphical user interface.

In another embodiment of the present invention, computer executable software code stored on a computer readable medium, the code being for a computer implemented method for providing system security and resource management comprises code for managing event messages by a master control processor between system handlers according to security system policies, code for processing network messages by a network handler between client and server computers, code for inserting native and third party event messages received by an insertion handler into the master control processor for processing by other system handlers, code for detecting and processing event message signatures by the signature handler from alarm, system, and insertion events for conversion into system alarm messages for action by the other system handlers, and code for performing actions by an action handler in response to action requests from the master control processor. The computer executable software code method may further comprise code for maintaining an execution environment by an agent handler for mobile autonomous code modules, code for collecting and logging event messages by a logging handler, and code for managing system configuration parameters by a configuration handler.

BRIEF DESCRIPTION OF DRAWINGS

These and other features, aspects and advantages of the present invention will become better understood with regard to the following description, appended claims, and accompanying drawings wherein:

DETAILED DESCRIPTION

Figure 1:
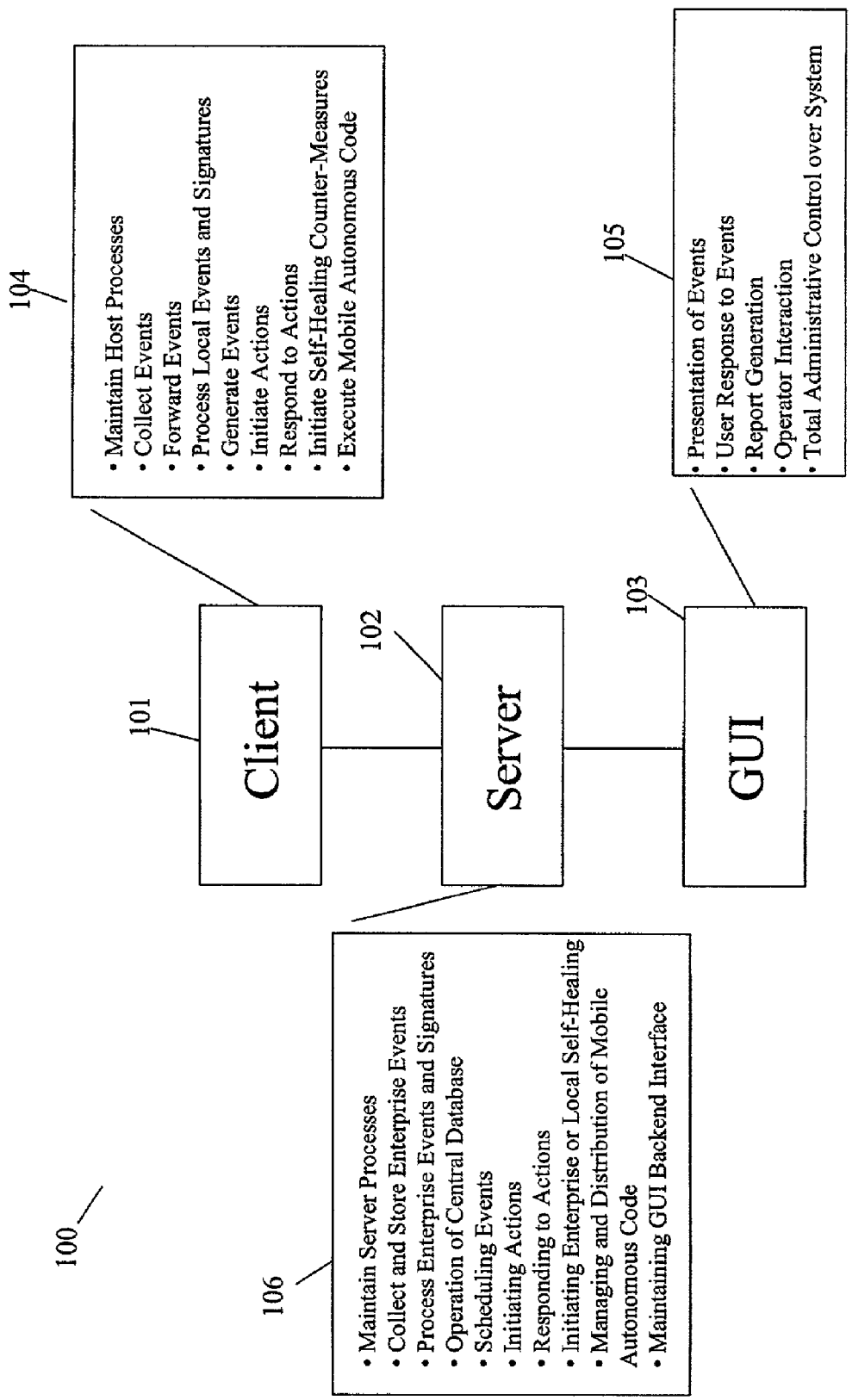
FIG. 1 shows an overview of a computer security and management system according to an embodiment of the present invention.

Turning now to FIG. 1, FIG. 1 shows an overview of a computer security and management system 100 according to an embodiment of the present invention. In the present embodiment, the system is comprised of a client computer 101, a server computer 102 and a graphical user interface 103. Although FIG. 1 depicts one embodiment of the present invention, other embodiments may include as few as one combined client/server computer or a multiple of client and server computers. These components may be linked together through encrypted and mutually authenticated communication links to prevent viewing of sensitive data by unauthorized personnel and to thwart any attempts at subverting the protective mechanisms. The components isolate and process system status messages, security alarms, basic and advanced administration tasks, mobile autonomous agent functions, self-healing network functions, and user-implemented modules to present a unified interface to administrative personnel. Many of the tasks are automated and self-configurable to reduce administrative workload and increase overall system reliability. All components are configurable by the end-user to allow for customization of the end product for site-specific needs. The client computer 101 is responsible for maintaining host processes, collecting and forwarding events, processing local client signatures, generating events, initiating and responding to action requests, initiating self-healing counter-measures, and hosting mobile autonomous agents 104. The server computer 102 is responsible for collecting and storing events, processing enterprise client signatures, generating events, operating the central system database, scheduling events, initiating and responding to action requests, initiating self-healing counter-measures, maintaining GUI backend infrastructure and managing the mobile autonomous agents 106. The GUI 103 is responsible for presentation of events, allowing users to respond to events, generation of reports, scheduling of events, and allowing administrative control over all system processes 105. The GUI 103 may be hosted on a separate computer or may communicate directly with either the client computer 101, the server computer 102 or both, or may communicate with the client computer 101 and the server computer 102 via a network such as an Internet, Intranet or the like.

The architecture of the system is designed to allow modularity and flexibility in the components. The modularity allows easy expansion, yet the design of the architecture allows effective monitoring and control with a minimum number of components operating. In FIG. 1, only one client computer 101, server 102 and GUI 103 are shown. However, multiple components of each type may be used in the present invention. The system reuses software concepts and components wherever possible. The system is designed so that the server 102 and client 101 function as similarly as possible internally. In one embodiment, the difference between the two is the way in which data is sent and received. Most client and server components can be reversed depending upon the role they serve in the system. This design has an added benefit of creating clients that can "morph" or change into servers in case of central system failure or other problem. For example, the system is designed with "reversible" components so a client system can work as a server and the server software is reused wherever possible to avoid redundancy. The architecture has built-in mechanisms for detecting failures and circumventing problems. The architecture allows expansion through a simplified Application Programming Interface (API) and standardized messaging format.

Figure 2:
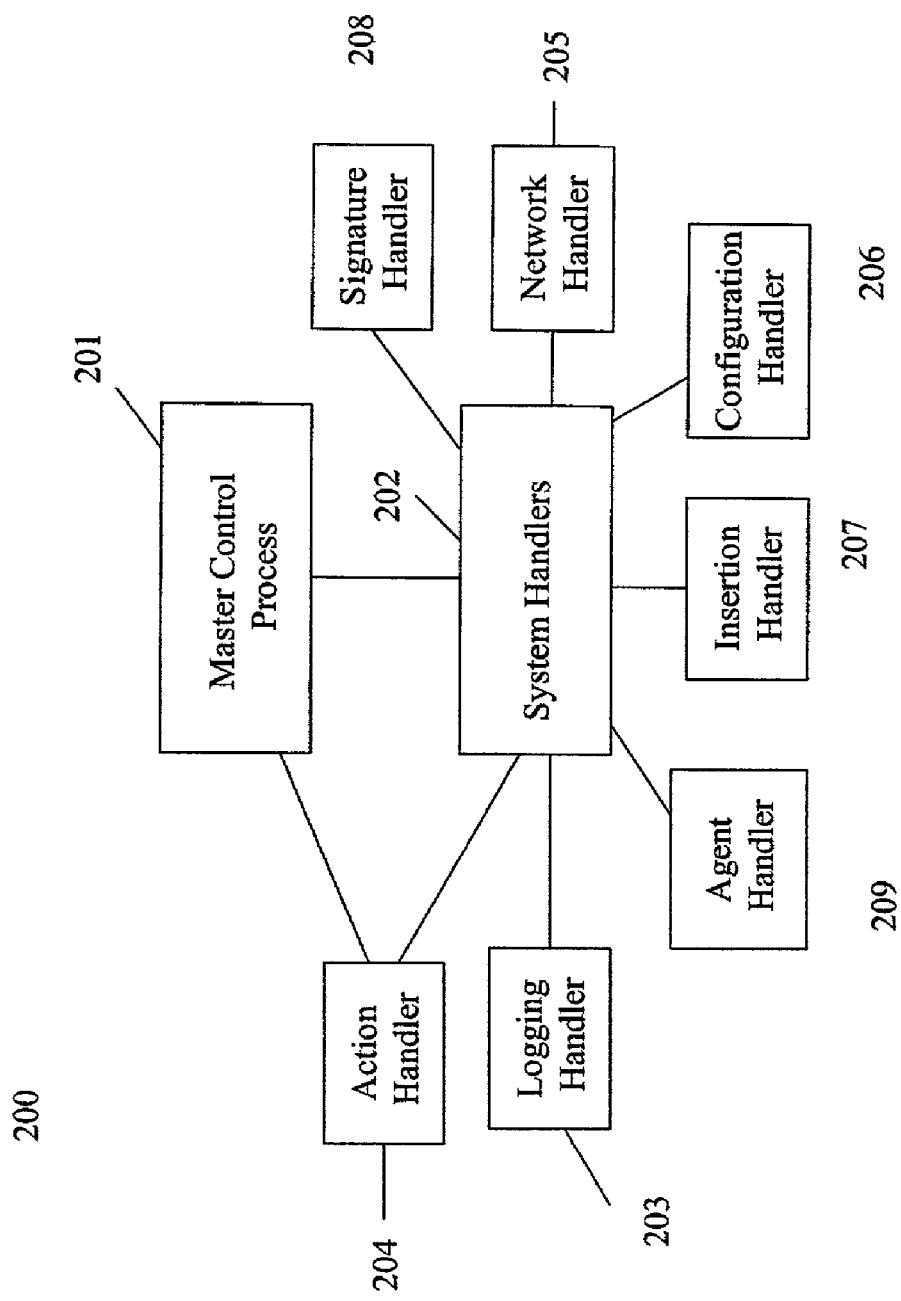
FIG. 2 shows a block diagram of the master control process and system handlers according to an embodiment of the present invention.

Turning now to FIG. 2, FIG. 2 shows a block diagram of the master control process and system handlers 200 according to an embodiment of the present. Both the client 101 and server 102 computers of FIG. 1 contain a Master Control Process (MCP) 201 and system handlers 202. The MCP 201 functions as a message routing system that handlers 202 communicate with. Handlers 202 register themselves with the MCP 201 and then may use the MCP 201 to pass messages between themselves. In this way, the MCP 201 functions as a passive message traffic controller and is not involved in the actual operation of the handlers 202 themselves.

The MCP 201 is a component of both the client and server systems. The MCP 201 may be an identically functioning software component in both the client and server computers (or similarly functioning software component) that manages a series of system handlers 202–209 that have registered with the MCP 201. The MCP 201 is responsible for passing communication messages between the handlers 202–209 and for managing this message traffic according to system policies. The MCP 201 is designed to be an expandable lightweight multi-threaded application with expandable communication paths that manages a series event queues on the system. Attached to these queues are "handlers" 202–209 that are either static (always running) or dynamic (executed on demand) system processes.

A "system handler" 202–209 is software designed to perform one or more specific functions. These functions can be initiated by the handler 202 itself through external or internal mechanisms or be passed to the handler from the MCP 201 for processing. Handlers are written to process one or more type of messages depending on the application. Handlers register themselves as services on the MCP. These services are accessible through the MCP as Remote Procedure Calls (RPC). The RPC mechanism allows for local or remote callers equal access to system assets transparently. In one embodiment, the RPC services provided are independent of the MCP's knowledge, that is, handlers may automatically register their capabilities with the MCP and the MCP requires no knowledge of their function. For example, the MCP 201 just needs to know how to accept registration of services and does not need to know what each specific service does. The MCP 201 can pass multiple message types between handlers depending on the auto-registration process. The MCP 201 uses a lightweight threaded programming design. The entire process is very fast with low overhead for rapid processing of messages and routing information. Using this generic mechanism allows the actual MCP 201 to contain a minimal amount of code for maximum reliability and speed.

Because the MCP 201 requires no knowledge of the handler functions, it can function in a "reversible" mode on both the client and server. That is, the same or similar software code may be used on both the client and the server with handlers designed for either server or client side operation. Additionally, a client on a network may switch into server operation in the event of a failure of the main central server. This provides for a fault-tolerant command and control mechanism. In another embodiment, the system with MCP reversible client/server software provides for client-to-client communications and "defense clusters" where groups of computers communicate with one another to defend themselves completely independent of central control. Clients can communicate in a peer-to-peer fashion to form these defense clusters where systems can defend themselves independent of a central control point.

As discussed above, "handlers" 202–209 are software code designed to perform one or more specific functions. These functions can be initiated by the handler itself through external or internal mechanism or be passed to the handler from the MCP on its input queue for processing. Handlers are written to process one or more types of messages depending on the application. Handlers register their services to the MCP and can provide these services to remote callers as an RPC mechanism.

Handlers are designed to be very focused pieces of code that perform a fixed set of very specific functions. Because in one embodiment, a handler focuses on one area of the system, the number of software errors ("bugs") that are contained in the code may be reduced which optimizes overall system debugging efforts. Additionally, by containing the function of handlers to very specific areas, overall system integrity may be increased because message types and data can be restricted to parts of the system that require its use. This can improve speed along with system security.

Figure 3:
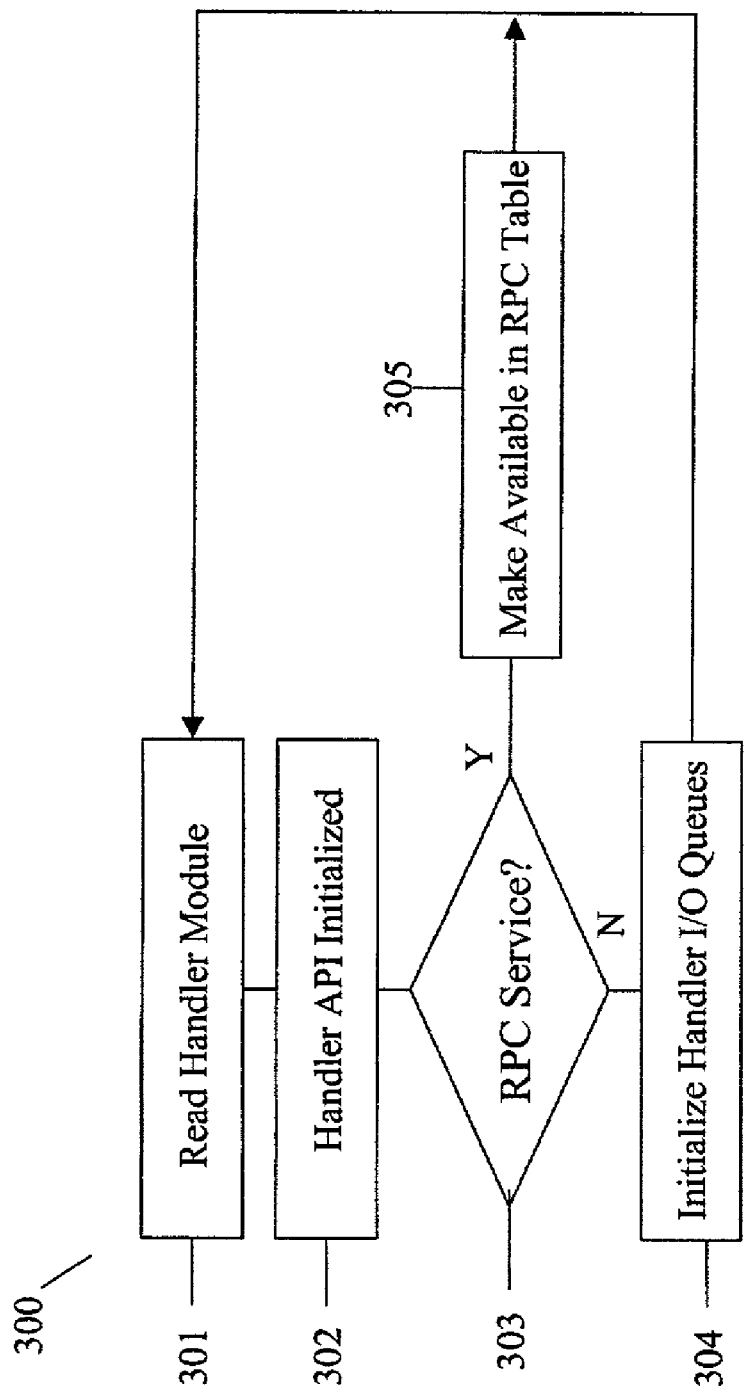
FIG. 3 shows flowchart depicting handler registration according to an embodiment of the present invention.

Turning now to FIG. 3, FIG. 3 shows flowchart depicting handler registration 300 according to an embodiment of the present invention. Before a handler can begin operation the MCP must initialize it. Since the MCP is the ultimate controller of the system, all handlers must operate in a predictable and standardized manner. The MCP scans the local configuration file and handler directory for handlers that need to be initialized 301. Handlers are entered into the MCP by name and the Handler API is initialized 302. The Handler is then initialized to begin both generation and processing of system events it is designed to accommodate. If the Handler is to run as an RPC service 303, its capabilities are made available through the RPC interface for local or remote callers 305. Otherwise, if the Handler is not going to run as an RPC service, the handler input/output queues are initialized 304. Handler Registration 300 is performed on MCP system startup, operator request, handler "wakeup", or similar system operation. Handlers have a reversible software architecture that allows them to be used in either a client or server computer mode. This eliminates redundant code, eases debugging, and allows for optimization of handler operations.

Turning back to FIG. 2, handlers serve a variety of purposes depending on their type. Since the handlers perform the vast majority of system operations, they are often charged with performing a variety of tasks such as:

Logging Handler 203 Logs system events locally or remotely.

Action Handler 204 Responds to system requests to perform active actions locally.

Network Handler 205 Processes network traffic to and from the client and server.

Configuration Handler 206 Manages configuration of the client and server systems either locally or remotely Insertion Handler 207 Allows native and third party applications the ability to insert events directly into the system architecture.

Signature Handler 208 Processes events and converts the events into system alarms.

Agent Handler 209 Provides remote execution and reporting environment for mobile autonomous code.

In addition to the above listed handlers, other handlers may provide for the processing of any other activity as specified by the operator of the system. Because the MCP is built upon a generic architecture and the handler contains an API and standardized messaging format, new handlers can be added. All handler modules are pluggable and can be changed by an operator or as the host computer system allows.

Referring to FIG. 2, the Logging Handler 203 enables the system to audit events for the local system on which it resides. The Logging Handler 203 can accept messages to be logged from any part of the system for any reason. The Logging Handler 203 may log the event in any number of ways to the local system that includes:

Text-based file
Local system auditing facility (Unix® compatible syslog daemon, Windows NT® event log, etc.)
Cryptographically signed secure log format
Directly to the system console
E-mail notification
Direct user notification
System wide notification The Logging Handler 203 may forward log messages directly to a remote server for logging in the central database and for reporting of system generated events. The Logging Handler 203 can accept multiple file formats for input and output. The Logging Handler 203 can cryptographically secure log files for protection of forensic evidence. The Logging Handler can provide notification in a number of ways: via e-mail, direct messaging, system wide notification and user specified.

Referring to FIG. 2, the Action Handler 204 is responsible for receiving "action requests" from the system architecture and to react to those requests with appropriate responses. In this context an "action request" can consist of anything the Action Handler 204 is programmed to do. Typically, the Action Handler will be responsible for performing one of the following actions based upon its instructions:

Block a host with a modified route command
Block a host with a packet filter modification command
Disable a user account
Disable a network interface
Run an external user-defined command
Log the event
Send E-Mail or pager alerts
Send on-screen alerts to users or administrators
Request server executed action
Any other pluggable action as defined by the user The Action Handler 204 is designed with pluggable action modules. These action modules allow the Action Handler 204 unlimited functionality. With pluggable action modules the Action Handler 204 can be presented with new action types to process with no additional configurations. Additionally, for an action the Action Handler 204 is not capable of executing, it can request those action types be sent to it from the server as new pluggable action modules. This allows the Action Handler 204 to use pluggable reaction modules to expand capabilities. The Action handler can respond with blocking hosts, users, networks, running commands, logging events, disabling interfaces, disabling computer, sending e-mail, paging personnel, providing on-screen alerts, etc.

The actions that the Action Handler 204 is capable of performing must describe the parameters required for proper execution. These parameters are defined in their configuration and vary depending on their function. Parameters for the action are defined in the configuration file for the action module. So if an action is designed to block hosts, the parameters required in the configuration file would be an address of a host to block. For example, for a host blocking action type, the Action Handler 204 requires a host IP address to block (usually the attacking host). In another example, for a user disabling action type, the Action Handler 204 requires a username to perform the disable action. The Action Handler 204 passes action parameter information to a pluggable action module where the actions can be executed. The Action Handler 204 does not need to know the details of the actions, but only that the correct parameters are being passed based on how the actions are registered with the system.

Figure 4:
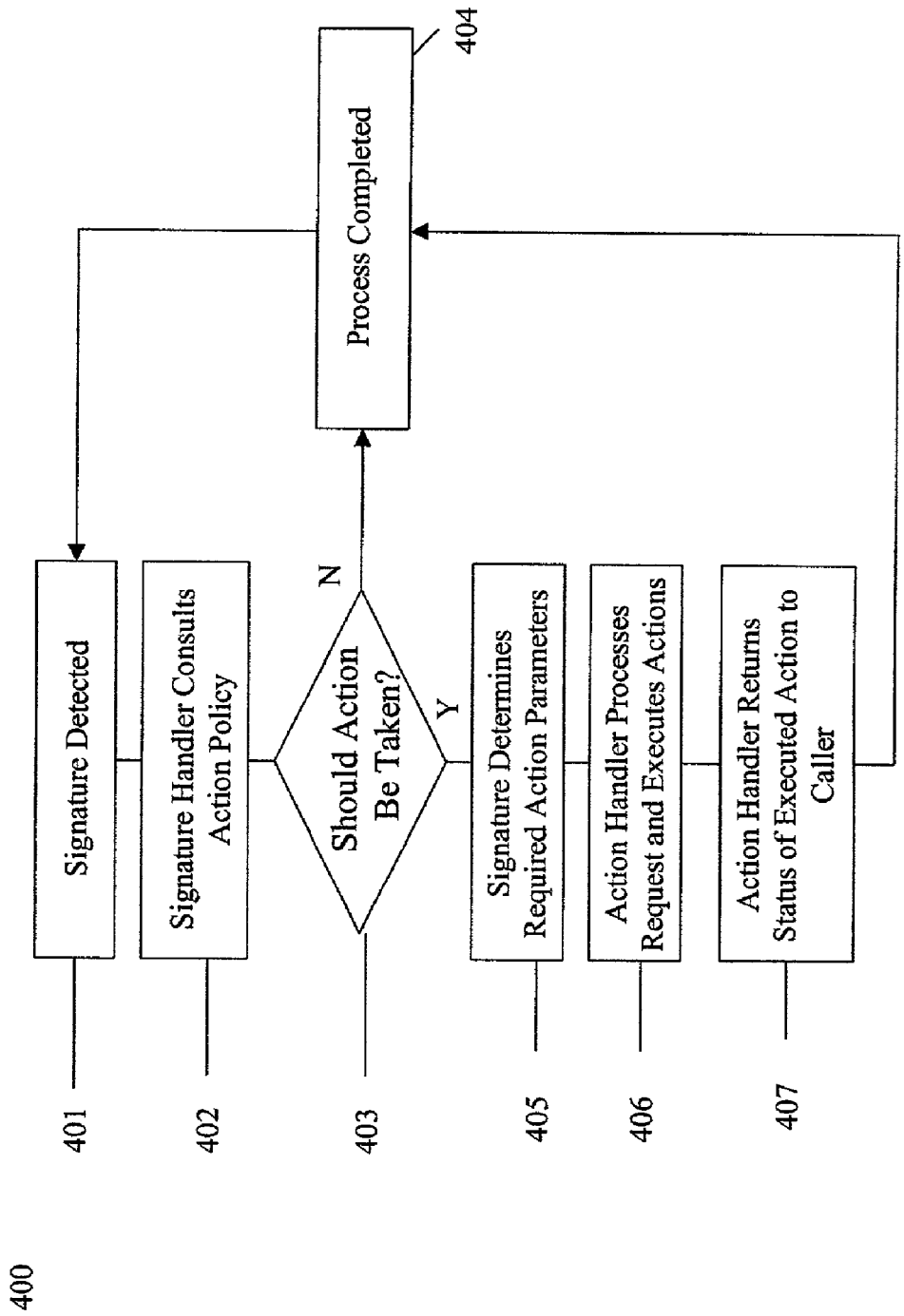
FIG. 4 is a flowchart of action parameter processing for signature detection according to an embodiment of the present invention.

Turning now to FIG. 4, FIG. 4 is a flowchart of action parameter processing for signature detection 400 according to an embodiment of the present invention. Action type parameters are specified for the signature-processing portion of the present invention. Signatures entering the system are processed in real-time and the response action is retrieved from the local action policy. The action policy will tell the signature how to respond (block the host, disable the user, etc.). The signature will then pass the appropriate parameters to the action type depending on what the action type requires to operate correctly. A signature detects an attack (for example, a port scan) 401 by reading the signature module. The Signature Handler (208 in FIG. 2) consults action policy 402 to determine an action needs to take place (in this example, blocking the attacking host) 403. The Signature Handler looks up what parameters the block host action needs (attacker's IP address) 405. The Action Handler (204 in FIG. 2) processes the request and executes the actions 406 (in this example, passes the attacker's IP address to the block host action for execution). The Action Handler returns the status of the executed action to the caller 407 and the process is completed 404. The Action Handler finishes processing the request and sends the result of the operation to the MCP. The MCP routes the status message to the Signature Handler which then routes the message according to it policy (typically to a local log and to the central server) to report the status of the request.

Figure 5:
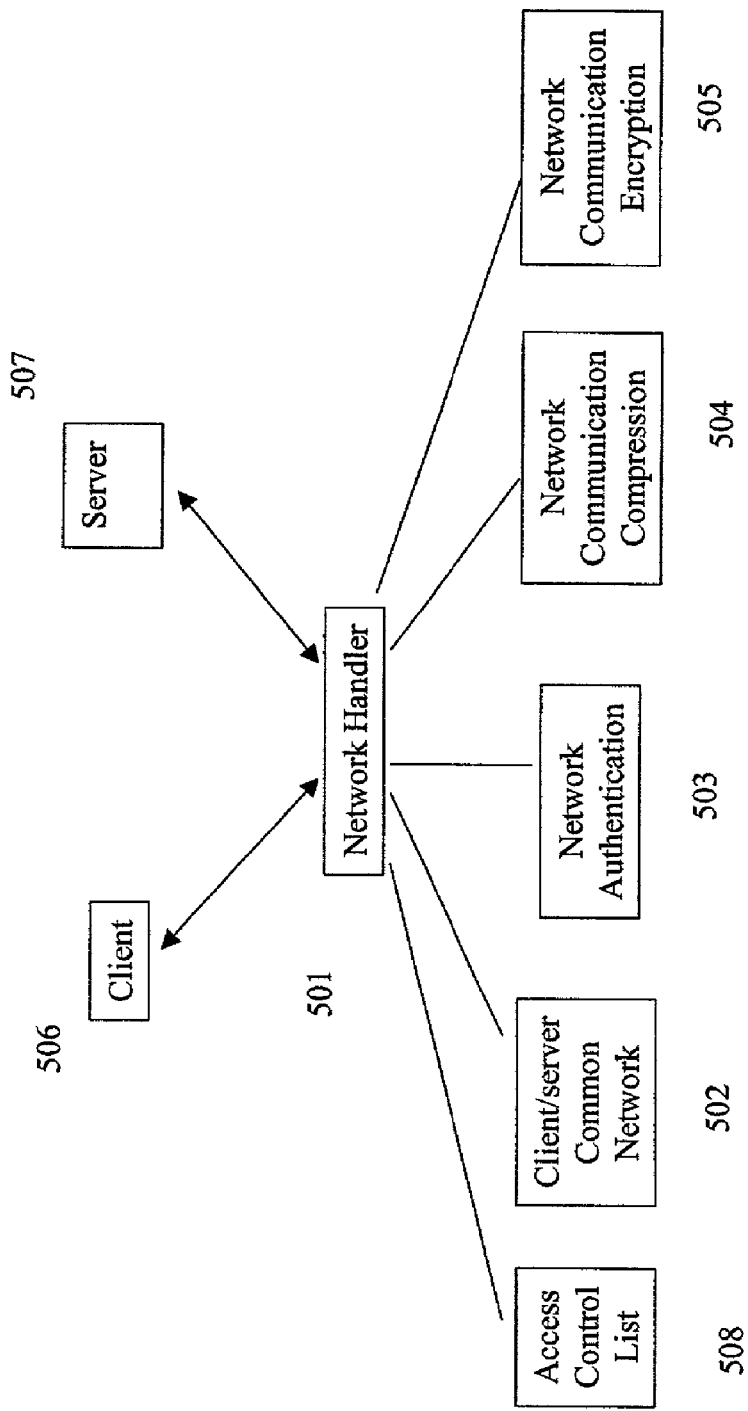
FIG. 5 is a functional block diagram of the Network Handler.

Turning now to FIG. 5, FIG. 5 is a functional block diagram of the Network Handler 501 (205 in FIG. 2). The Network Handler 501 is responsible for all network-bound communications in the present invention. The Network Handler 501 is responsible for the following: incoming and outgoing Client/Server Common Network 502 communications from the Client 506 or Server 507, including Access Control 508 and Authentication 503, Compression 504 and Encryption 505 of all network communications.

The Network Handler 501 is designed to use any available network protocol as its communications medium. For example, the Network Handler may use a Transmission Control Protocol (TCP) based communications protocol to send data in the form of message units.

The Network Handler 501 only accepts connections from clients and servers defined in its internal Access Control List (ACL) 508. The ACL 508 is stored in a local file, database, or other suitable format and is consulted whenever an incoming connection request is made. Clients 506 wishing to connection to the TCP port of the Network Handler 501 are first looked up in the appropriate ACL 508 table. If the client is listed in the ACL 508 then it is allowed to proceed to full authentication. If the client is not listed, the connection is dropped and the Client 506 or Server 507 generates an appropriate connection refused alarm event for reporting purposes.

The Network Authentication function 503, which contains the protocols for authentication within the Network Handler 501 can be changed depending on new or updated security vulnerabilities, enhancements in technology, or for other reasons. The Network Handler 501 supports multiple authentication types depending on speed and security requirements.

The Network Handler 501 can be expanded to provide a large number of authentication mechanisms for client and server communication depending on the needs of the system. The Server 507 may negotiate the default protocol to be used upon accepting the Client 506 through the network ACL 508. The Server 507 default protocol may be set by the system administrator. Provided protocols that allow for mutual authentication are preferred. During the negotiation phase, the Server 507 will list one or more protocols for authentication that it will accept. If the Client 506 does not support the protocol requested, it may choose from a list of other potential protocols the Server 507 will accept. If the Client 506 supports none of the protocols the Server 507 requests, the connection is dropped and both the Client 506 and Server 507 are notified. Notification may be by generating an appropriate alarm event on the Client 506 and Server 507.

The network data that the Network Handler 501 will be forwarding and receiving can be very large in size. To minimize bandwidth consumption, the Network Communication Compression function 504 compresses the data before it is sent using a compression algorithm. Many types of compression algorithms are possible including Huffman/LZ77 encoding or similar type of algorithm. Because encrypted data usually does not compress well, the data compression algorithm is normally implemented before processing by the Network Communication Encryption function 505 of the communication protocol. Any compression algorithm can be used for this purpose, or compression can be completely disabled if required by the administrator.

Because critical information will be passed over the client and server communications links, the Network Handler 501 includes a Network Communication Encryption function 505 which contains one or more data encryption algorithms for encrypting all network data. The Network Handler 501 is responsible for negotiating the encryption algorithm to be used on the data stream. Encryption algorithms may be added or removed from the Network Handler 501 depending on the configuration.

During authentication, the Server 507 presents a list of encryption algorithms it is willing to accept. The Client 506 may then select an algorithm. If the Client 506 supports none of the encryption protocols of the Server 507, then the connection is dropped and both the Client 506 and Server 507 are notified. Notification may be by generating an appropriate alarm event on the Client 506 and Server 507. The system administrator may add or remove encryption protocols.

The Network Handler 501 can switch to different authentication and encryption protocols and methods in the event of a security compromise of one of its methods.

Authentication and encryption mechanisms are changeable on the Client 506 and Server 507, depending on system requirements or security needs.

Turning back to FIG. 2, the Configuration Handler 206 provides an interface to system configuration libraries and data stores for system parameters. The Configuration Handler 206 is responsible for interfacing these generic calls so other handlers, system processes, and system operators can have quick, reliable, and uniform access to configuration data. The Configuration Handler 206 is responsible for providing the following access to system parameter data:

Read Allows system parameters to be read
Write Allows system parameters to be written or added
Change Allows system parameters to be changed
Backout Allows system parameters to be reverted back to the previous version
Delete Allows system parameters to be deleted
Backup Allows all system parameters to be backed up The Configuration Handler 206 is responsible for all relevant file locking and multiple access protection mechanisms as well as providing sequential access to threads, processes, and system operators. The Configuration Handler 206 allows configuration of the system to occur locally or remotely from the central command and control system.

Figure 6:
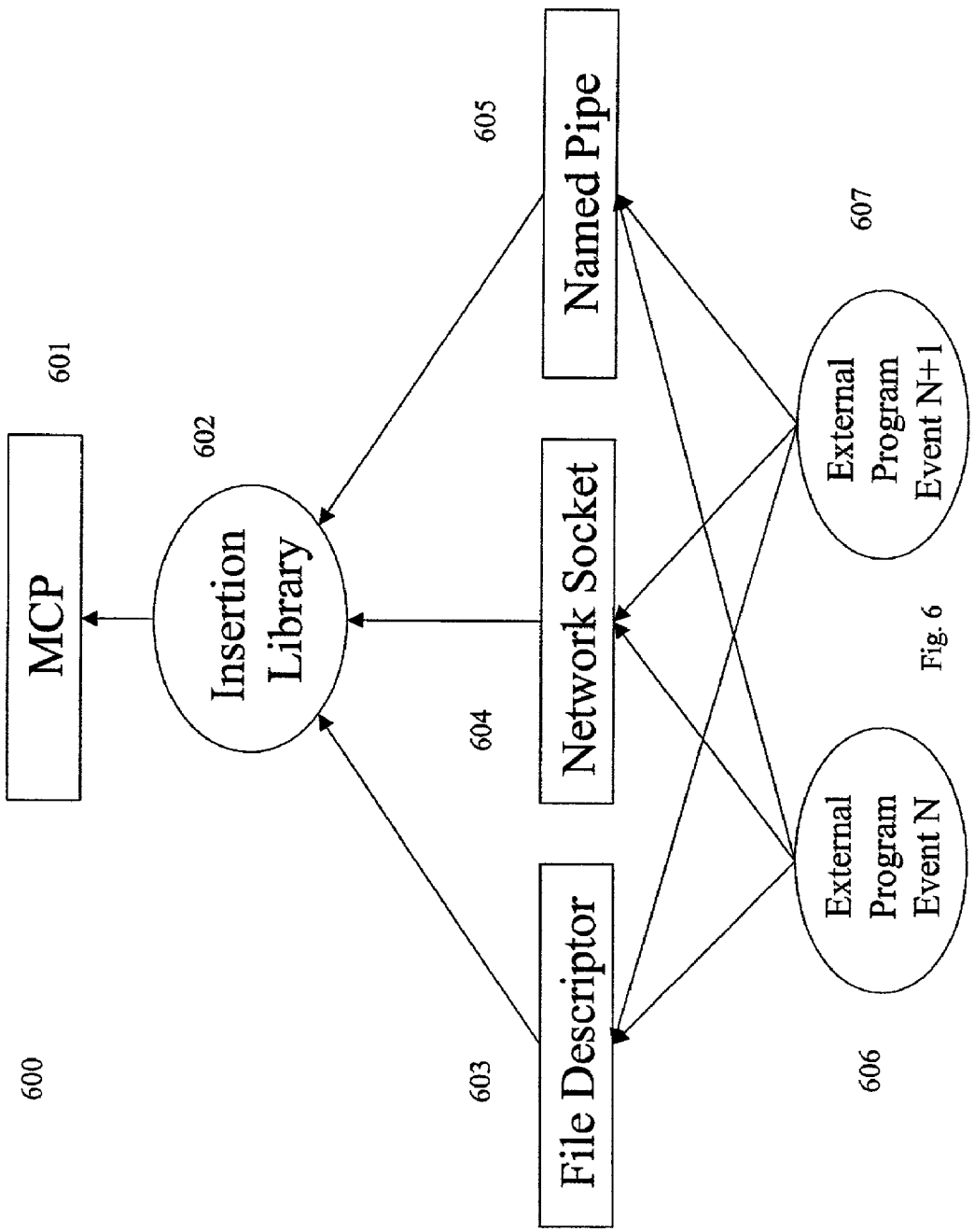
FIG. 6 is a functional block diagram of the Insertion Handler.

Turning now to FIG. 6, FIG. 6 is a functional block diagram of the Insertion Handler 600 (207 in FIG. 2). The Insertion Handler 600 is a mechanism whereby native or third party applications can insert events directly into the present system. The Insertion Handler 600 accepts messages, ensures they are in the correct format, and then forwards them to the MCP 601 for further processing. The Insertion Handler 600 has two modes of data insertion containing Insertion Libraries 602: a native insertion library and an external insertion library.

The Insertion Handler 600 provides the mechanism for inserting events from External Programs 606, 607 into the system by any of the following means: placing a File Descriptor 603 on the system for reading/writing, placing a Network Socket 604 on the system for reading/writing or placing a Named Pipe 605 on the system for reading/writing. The Insertion Handler 600 allows legacy, third party, or other applications the ability to send native messages directly into the system with few modifications. The Insertion Handler 600 allows communication with the system to occur with messages using a variety of input mechanisms (File Descriptor 603, Network Socket 604, Named Pipe 605 and the like). The Insertion Handler 600 can place file descriptors inside of protected environments to operate in a secure manner. In one embodiment, the Insertion Handler 600 is used to pass inserted alarm messages directly to the Signature Handler (208 in FIG. 2) for processing.

Referring to FIG. 6, in one embodiment, the Insertion Handler 600 can utilize a native Insertion Library 602 for injecting messages into the present system. The native Insertion Library 602 is a fixed set of methods that the native system programs or add-ons can access and use to directly insert messages. The native Insertion Library 602 would typically be used by programs written in the same language as the core architecture or by those programs developed for the core system specifically (e.g., those from the manufacturer or by authorized third parties).

In another embodiment, the Insertion Handler 600 utilizes an external Insertion Library 602 that is essentially a "wrapped" version of the native Insertion Library 602 discussed above. The external Insertion Library is a C or C++ library designed to be linked to third-party sources (other languages such as Perl, Python, TCL, Unix® shell script, etc. can also be supported). This linked library provides a suite of system calls that allow the wrapped program to inject messages directly into the core system without special configurations. It only requires the addition of appropriate system calls throughout the code to audit relevant events (security, administrative, failure, error, etc.). Once the code has been modified in this way, it may then insert the messages directly into the core system as if it were a native application. The external Insertion Library 602 allows third-party applications to be modified and added to the present invention. The third-party applications then have the ability to detect whether the core system is installed and communicate directly with the system, minimizing user interaction and system overhead. The Insertion Handler 600 allows third parties to integrate system support using a variety of languages such as C, C++, Java, Perl, Python, and the like.

If File Descriptor 603 insertion mode is used, the Insertion Handler 600 uses a Unix®, Windows NT®, or similarly based mechanism for placing a "file descriptor" directly onto the system. This File Descriptor 603 is continuously polled by the Insertion Handler 600 for new data from the Insertion Library 602, either the native or external Insertion Library 602. Once data is received on the socket it is inserted into the MCP 601 after appropriate validation checks on the data have been performed. The File Descriptor 603 for the Insertion Handler 600 is placed in a secured directory and is only accessible to authorized programs and system services. This method may also allow the creation of multiple file descriptors that can be placed in user-defined directories. This allows the Insertion Handler 600 to work in UNIX® chroot( ) or similar secured operating environments for running un-trusted code.

If Named Pipe 605 support insertion mode is used, the Insertion Handler 600 uses either the Unix® and Microsoft® operating system environments. This mode functions almost identically to the File Descriptor 603 insertion method described above with the difference being that a "named pipe" instead of the local file descriptor is used. A pipe is a technique for passing information from one program process to another and is a one-way communication. A named pipe is a method for passing information from one computer process to other processes using a pipe or message holding place that is given a specific name. Unlike a regular pipe, a named pipe can be used by processes that do not have to share a common process origin. The message sent to the named pipe can be read by any authorized process that knows the name of the named pipe.

The Network Socket 604 insertion mode is the most generic method for accepting messages by using a local network socket listening on the system for new insertion messages. This mode of operation requires the opening of a locally bound network socket on the system. Like the other modes, the socket is continuously polled by the Insertion Handler 600 for new data from the Insertion Library 602, either the native or external Insertion Library 602. Once data is received on the Network Socket 604, it is inserted into the MCP 601 after appropriate validation checks on the data have been performed.

For security reasons, in one embodiment this socket is limited to connections from the local host system. The Network Socket 604 insertion handier is a TCP based socket to protect against maliciously forged packet attacks.

The Insertion Handler 600 (207 in FIG. 2) messages are generally passed to the Signature Handler (208 in FIG. 2) as described below. In one embodiment, the Insertion Message should at a minimum: be formatted in a mark up type language (such as Extensible Markup Language (XML)), define the originator of the message (for example a third party application or internal system application), define an alarm identification type to allow the Signature Handler (208 in FIG. 2) to properly pull out relevant alarm data and contain all relevant alarm data necessary to allow the corresponding signature to process the event.

All messages passed into the Insertion Handler 600 should have a corresponding signature in the Signature Handler (208 in FIG. 2). The signature determines how the message will be processed and what actions should be taken when it is received. If the message cannot be processed by the Client (506 in FIG. 5), the Signature Handler (208 in FIG. 2) passes the message onto the Server (507 in FIG. 5) for processing.

Returning now to FIG. 2, the Signature Handler 208 processes alarm events in real-time or near real-time and decides any actions and responses of the system to the alarms. In one embodiment, the Signature Handler 208 accepts the following types of messages:

1. Alarm events Those events generated by native detection mechanisms to indicate a security, management, or similar event.

2. System events Errors, status, and other informative messages relating directly to the present invention system.

3. Insertion events Those events generated by either native or external programs that were passed via XML format into the Insertion Handler 207 (600 in FIG. 6). These events are usually Alarm events relating to security, management, or similar situation.

The Signature Handler 208 operates similarly to the MCP 201 but it is only responsible for alarm events and not for individual handlers as is the MCP 201. The Signature Handler 208 is responsible for the conversion of events into system alarms with which the present invention system can report and respond to.

Figure 7:
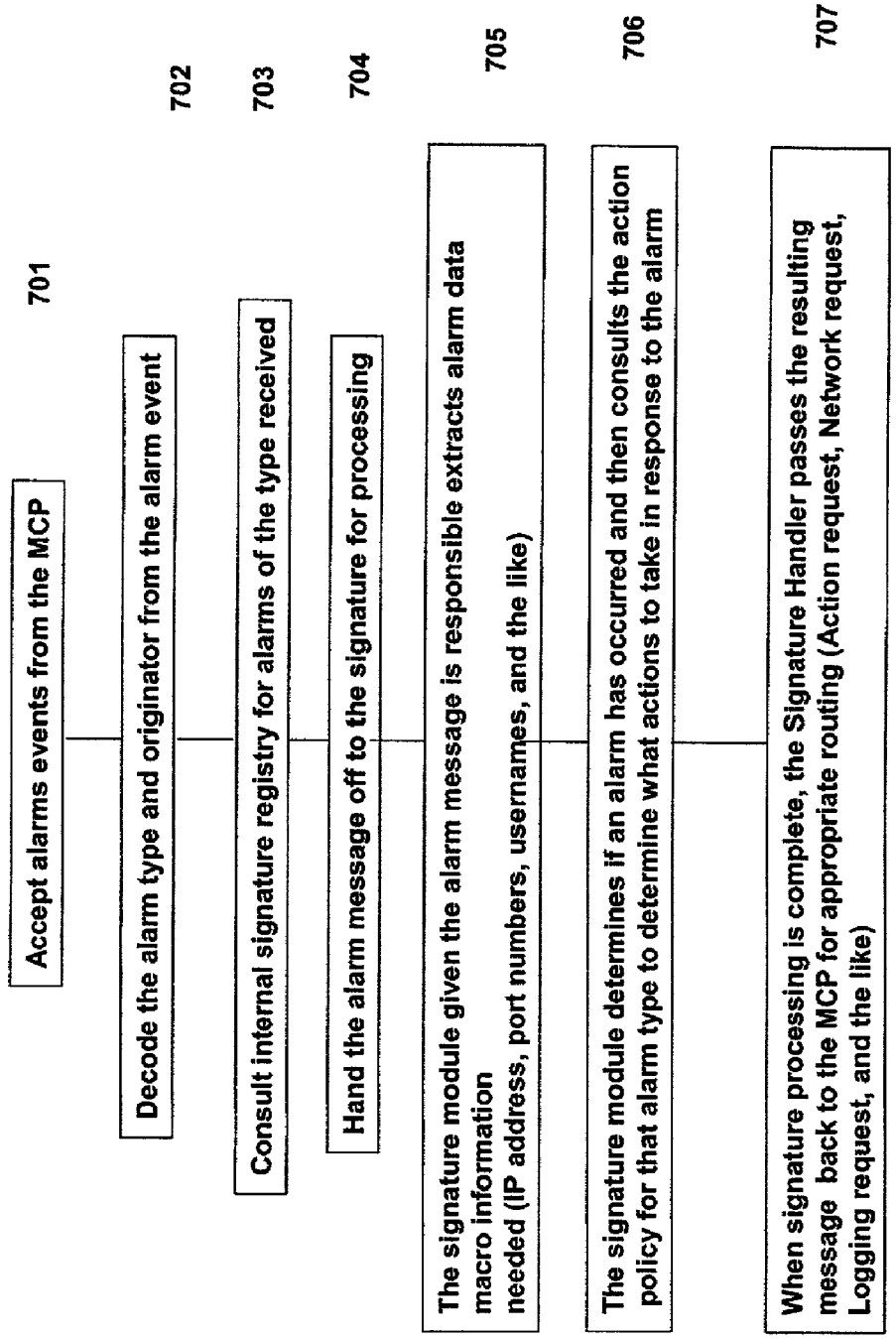
FIG. 7 is a flowchart of the processing of the Signature Handler.

Turning now to FIG. 7, FIG. 7 is a flowchart of the processing of the Signature Handler (208 in FIG. 2). The Signature Handler accepts alarms events from the MCP 701. The Signature Handler decodes the alarm type and originator from the alarm event 702. The Signature Handler then consults its internal registry of signatures that wish to process alarms of the type received 703. The Signature Handler then hands the alarm message off to the signature for processing 704. The signature given the alarm message is responsible for pulling out the alarm data macro information it needs to function correctly (IP address, port numbers, usernames, and the like) 705. The signature determines if an alarm has occurred and then consults the action policy for that alarm type to determine what actions to take in response to the alarm 706. The Signature Handier extracts relevant information from the alarm, insertion, or system event to pass into the action message. This data can include such things as IP Addresses, Usernames, Process Identification and the like. When signature processing is complete, the Signature Handler may then pass the resulting message back to the MCP 201 in FIG. 2) for appropriate routing 707 (Action request, Network request, Logging request, and the like). The Signature Handler uses modular signatures that automatically pull necessary data from the alarm events received. The Signature Handler can operate independent of a central control system and can act autonomously based on pre-established policy in the system.

The Action Policy in the Signature Handler (208 in FIG. 2) is a list of actions that can be taken for each event that is processed by the Signature Handler itself. The Action Policy is configurable by the system administrator and maps the responses the system will perform relating to each detected event. In a simple embodiment the Action Policy contains a signature identification and a list of response actions to each signature. In addition, each action requires inherent data to operate correctly. With each response request coming in, the signature is responsible for supplying supporting data to ensure the action can operate correct. For example, if the Action Policy requires that a host be blocked as a result of a port scan, the Signature Handler must know the Internet Protocol (IP) address of the attacking host to pass into the blocking function otherwise the call will fail. Examples of required data include but are not limited to those listed in Table 1.

TABLE 1

| Action Type | Information Required from Signature |
|---|---|
| Block Host | Target IP Address |
| Disable User | Target Username |
| Disable Network Interface | Network Interface Name |
| Send e-mail | E-mail address and data |
| Move/copy/delete file | Filename |

The individual signatures require intelligence to properly pull out the required information from each signature (such as attacker IP addresses, usernames, and the like). In one embodiment, XML formatting is used to isolate the data types within each signature to make the processing easier. For many cases, the local detection modules that generate the event will have this data already separated. As an example, if a port scan is detected by a port scan local detection module, it generated and event and the processing is as follows. A port scan to a TCP port 143 (IMAP) is detected by the port scan detector . The port scan generates an alarm event that contains the alarm ID (which maps to the TCP port scan and the alarm data (for example, the IP Address of attacker, port number being scanned, and scan type). The alarm data is encapsulated into an alarm event format whereby the data is pre-processed with XML tags so items such as the attacker IP address, port number being attacked, and scan type are already separated for example:

a. <attacker_ip>192.168.2.30</attacker_ip>
    b. <attacker_port_number>143</attacker_port_number>
    c. <attacker_scan_type>FIN Scan</attacker_scan_type>

The entire alarm event is then sent to the Signature Handler (208 in FIG. 2).

Once inside the Signature Handler (208 in FIG. 2), the alarm event data is passed to the appropriate Signature Handler, in this case the TCP Port scan detector. The Signature Handler then identifies that an alarm occurred and then looks up the action from the action event table:

1. TCP Scan detected
    2. Lookup action in action event table which indicates:
    a. Block host
    i. Block host action requires <attacker_ip> data to run.
    ii. Data retrieved from <attacker_ip> tag and sent to action handler
    b. Log event locally
    c. Send event to server
    i. Entire event is packaged inside a network message and forwarded to server.
    ii. Server may use XML data tags within its signature handler for further actions and reporting.

Using the above processing, the Signature Handler (208 in FIG. 2) is isolated from having to know any direct information on how the signatures and actions operate. The Signature Handler just needs to route the event as it is received which is resolved during the signature registration process. The action policy defines what actions to take in response to a detected signature. This policy is configurable by the user or may be preset to defaults on system initialization. For each action request, the Signature Handler is responsible for pulling out the data necessary for the action to run correctly.

Figure 8:
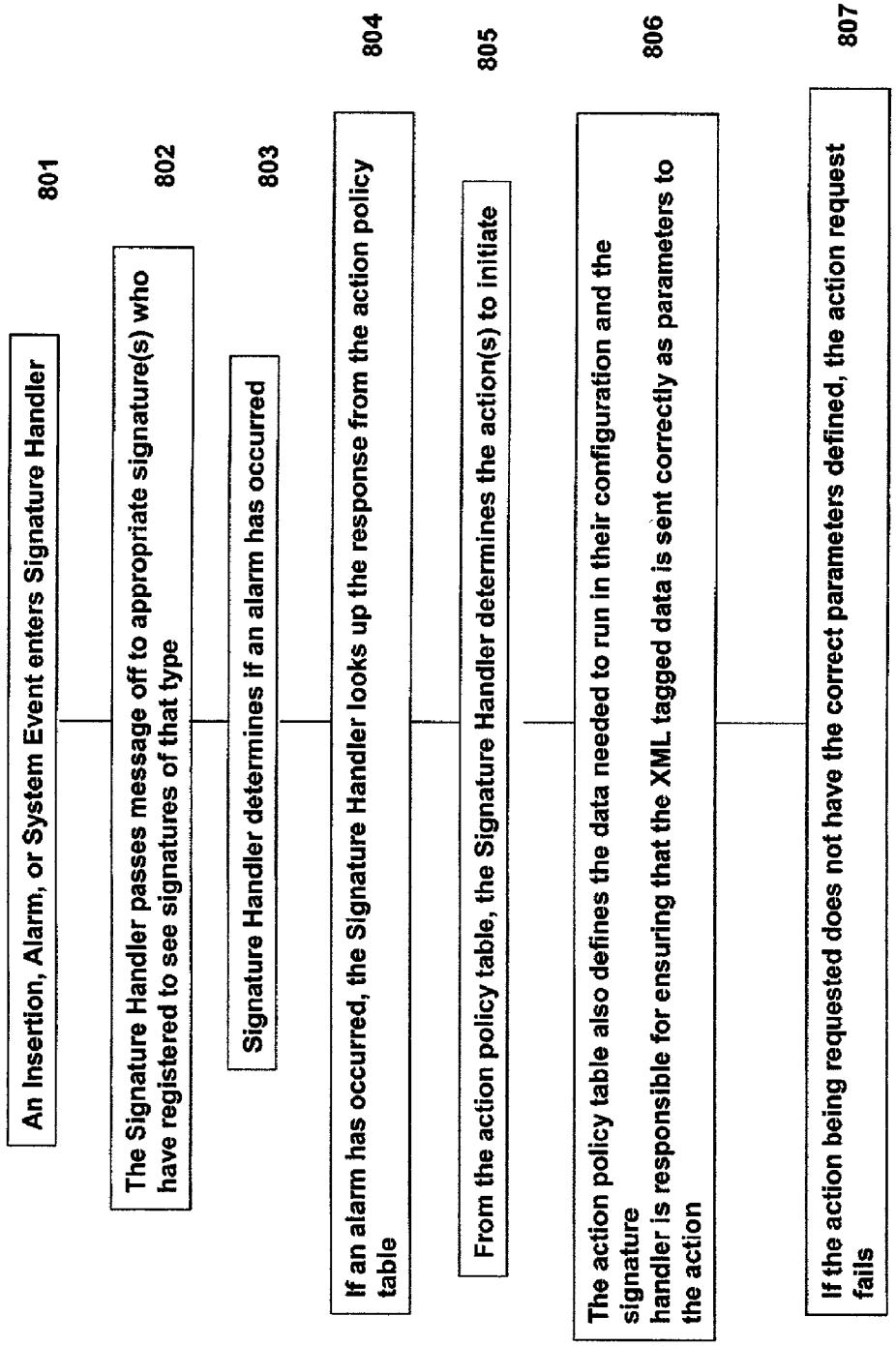
FIG. 8 is a flowchart of the processing of the Signature Handler.

Turning now to FIG. 8, FIG. 8 is a flowchart of the processing of the Signature Handler (208 in FIG. 2). An Insertion, Alarm, or System Event enters Signature Handler 801. The Signature Handler passes message off to appropriate signature(s) who have registered to see signatures of that type 802. The Signature Handler determines if an alarm has occurred 803. If an alarm has occurred, the Signature Handler looks up the response from the action policy table 804. From the action policy table, the Signature Handler determines the action(s) to initiate 805. The action policy table also defines the data needed to run in their configuration and the signature handler is responsible for ensuring that the XML tagged data is sent correctly as parameters to the action 806. Each action type defines what data it needs to operate which may be in a separate configuration file. If the action being requested does not have the correct parameters defined, the action request fails (i.e. Blocking a host requires at a minimum that the IP address to be blocked be provided) 807.

The Signature Handler maps incoming events to appropriate actions to perform. The process comprises accepting an event from MCP, diverting the event to the signature handler, determining if an alarm has occurred and if so, determining the appropriate response by looking up the local action policy and sending out appropriate response requests to the MCP.

In this case, all Alarm, System, and Insertion events must have corresponding signatures to process the alarm. However, not all signatures need to be directly related to each event. It is possible to have a generic "group" signature that only looks for system status events and simply re-packages them for passing across the network and logs them locally without processing them individually. This type of signature operates essentially as a "wildcard" parsing mechanism where any event type meeting a high-level mask is grabbed with minimal processing.

Alternatively, for specific signatures, the system may have only one particular signature type. An example may be a TCP port scan detection signature that looks for TCP port scans, pulls out the attacking host IP address, and then consults the action policy which directs that all alarms of this type blocks the host, logs the event locally, and passes it to the network controller. Then the signature will generate a block message for the action handler, a local log message, and finally a network message for the server to display on the GUI.

Figure 9:
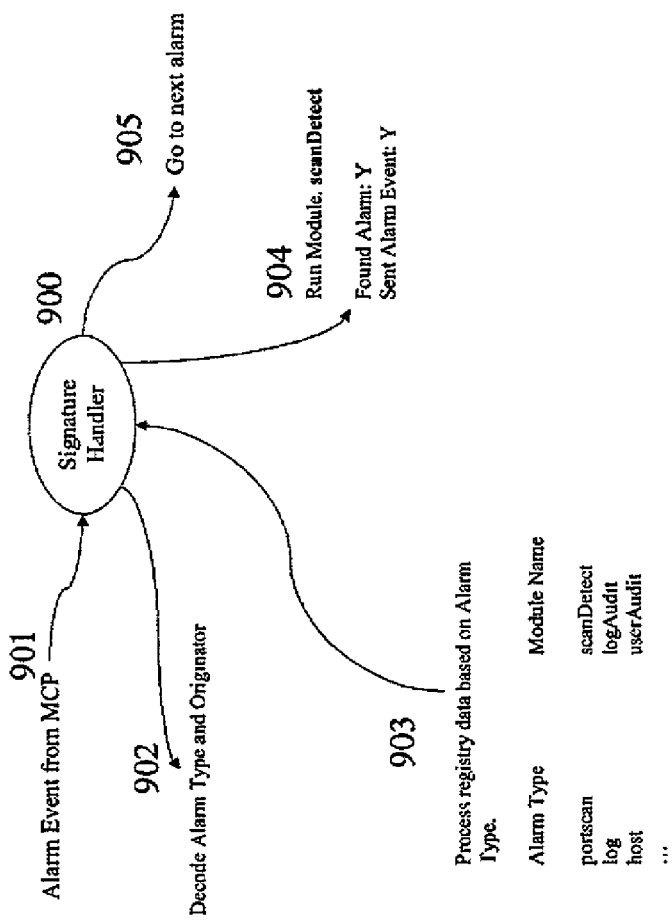
FIG. 9 shows the processing for decoding a "Port Scan" alarm.

Turning now to FIG. 9, FIG. 9 shows the processing for decoding a "Port Scan" alarm This is just one example of the types of alarms processed by the Signature Handler 900 (208 in FIG. 2). The steps of the processing are as follows. A "Port Scan" alarm event is received from the MCP 901. The Signature Handler decodes the alarm type 902. The Signature Handler 900 sees which pluggable signatures want to see the alarm 903. In this case the port scan alarm is processed by a scan detect module. The Signature Handler 900 passes the alarm off to those signatures interested in seeing it and returns appropriate message if the signature module should activate (scanDetect) 904. The Signature Handler 900 is responsible for looking up the local action policy for the event type received and sending that back to the MCP. The Signature Handler 900 repeats for next alarm 905.

The Signature Handler 900 functions similarly to the MCP. Signatures can be added or removed without modifying the core code base. Signatures can process what is of interest to them, sparing system resources. Signatures can maintain their own data between executions and can hold this data even between system re-starts or failures. Signatures can be customized depending on operator requirements, system optimizations, or other attributes. The Signature Handler 900 acts as a central point of control and can focus advanced control concepts into the system operation such as dynamic throttling of signature throughput under heavy load.

The Signature Handler 900 includes "pluggable" signature modules. A pluggable signature module is code that is designed to perform a specific detection task. Each of the pluggable signature modules is focused on a minimal number of alarm events to process and is capable of being written independent of the Signature Handler 900 itself. Signature modules may be inserted into and out of the Signature Handler 900 at will. During initialization of the Signature Handler 900, the handler determines what signatures are available for it to use. The signatures automatically register their capabilities with the Signature Handler 900. During this phase the Signature Handler 900 "registers" the signature modules as depicted in FIG. 10.

Figure 10:
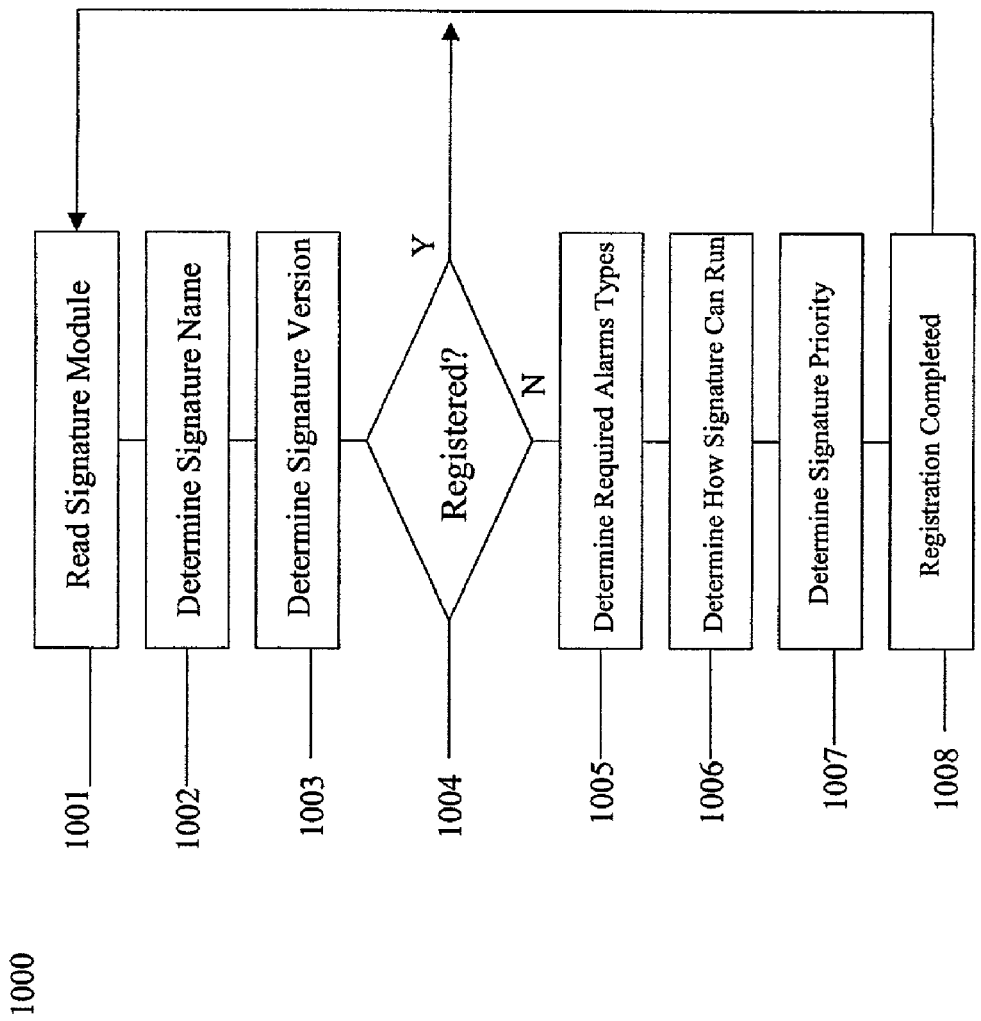
FIG. 10 is a flowchart of signature registration process.

Turning now to FIG. 10, FIG. 10 shows a flowchart of a signature registration process 1000. The Signature Handler (900 in FIG. 9) reads the signature module 1001, determines the signature name 1002 and determines the signature version 1003. If the signature is registered 1004, the required alarm types are determined 1005. How the signature is to be run is determined (for example, with threads, without threads, or as a process) 1006. The signature priority is determined 1007 and then registration is complete 1008. After the registration process 1000 is complete, the Signature Handler may then receive messages from the MCP (901 in FIG. 9) for processing. The signatures themselves are of two major types: Singular Signature Modules and Composite Signature Modules.

The Singular Signature Module requires the signature to take an input and return a true or false output depending on the alarm event data. This signature contains basic fall-through logic to determine the result. As part of its operation this signature type can store local state information in the database (for example a structured query language (SQL) database) for use in processing of future alarms and for tracking trends in data.

The Composite Signature Modules can use data stored by them in combination with data stored by other signatures or in globally available resources (such as SQL tables and the like). These signatures require that several items be true before they activate. These signatures can store local state information in the SQL database for use in processing future alarms and for tracking trends in data.

Pluggable signatures can use stored data from other signatures to detect alarms. Signatures can maintain long-running state information between executions. Signatures can maintain long-running state information between system startup and shutdown sequences.

The Signature Handler can operate in several modes of operation such as sequential processing or multi-threaded processing depending on where the handler is executing. In the Sequential Processing Mode, the Signature Handler pulls messages off of the MCP queue one at a time and processes them in sequential order. This mode is the simplest implementation of the system architecture and has several advantages such as ease of implementation, no re-entrant code issues in a multi-threaded environment, composite signatures can be executed without fear of corrupting internal signature state data and debugging of the system and following signature data flow is simplified. In the Multi-threaded Mode, the Signature Handler extracts messages from the MCP queue and directs them to a thread pool where signatures can be processed concurrently. This mode has several advantages such as faster processing of signatures, processing of other queued alarms is not delayed, threads can be assigned priorities so more important alarms can be serviced faster. The signature handler can process signatures one at a time or concurrently using threads or event scheduling.

Returning to FIG. 2, the Agent Handler 209 is responsible for the execution environment of Mobile Autonomous Code (MAC) modules that circulate throughout the network. Mobile Autonomous Code is described in more detail below. The primary responsibilities of the Agent Handler 209 are:

1. To ensure the MAC modules carry appropriate credentials and are authenticated and cryptographically signed by a trusted introducer (network administrator, operator, client system, etc.).

2. To ensure the MAC modules are able to execute on the host operating system by checking version numbers and other appropriate identification information.

3. To execute the MAC modules and not interfere with operation until the MAC module is complete or is ordered to stop by an authorized party.

4. To allow the MAC to complete and report its findings and/or execute any actions on the local system as requested by the MAC.

The present invention has several core security and intrusion detection mechanisms such as log security in the form of log audit functions, login and logout anomaly detection functions; session monitors and a port scan detector functions. These and other features are described in U.S. patent application Ser. No. 09/268,084 filed on Mar. 12, 1999, which is now U.S. Pat. No. 6,405,318, which is incorporated by reference herein.

The present invention comprises autonomous software programs that can patrol a communications network independent of the clients they are monitoring. Mobile Autonomous Code (MAC Agents) are independently distributed pieces of code that operate within a special execution environment within the client and server system. The MAC Agents are capable of performing any local system operation and reporting their findings to either a local, central, or distributed environment. While the initial goal of the present invention is to use MAC Agents to perform security operations, the overall goal is to use MAC Agents to administer and control all aspects of the networking environment and ultimately lead to a self-healing network architecture that can sustain itself with minimal human interaction. The MAC Agents are capable of moving between systems independent of the actual client. The MAC Agents are capable of performing any type of system operation permitted on the client. The MAC operate within a separate execution environment from the rest of the system that can be open or restricted depending on configuration. The MAC Agents can perform any security or system administration tasks and are targeted for use in self-healing network environment deployments. MAC Agents allow self-healing components of the system to move between clients and operate independently and where needed. MAC Agents can be written in either native object code or in a platform-independent interpreted language such as Python, Perl, or Java®.

Figure 11:
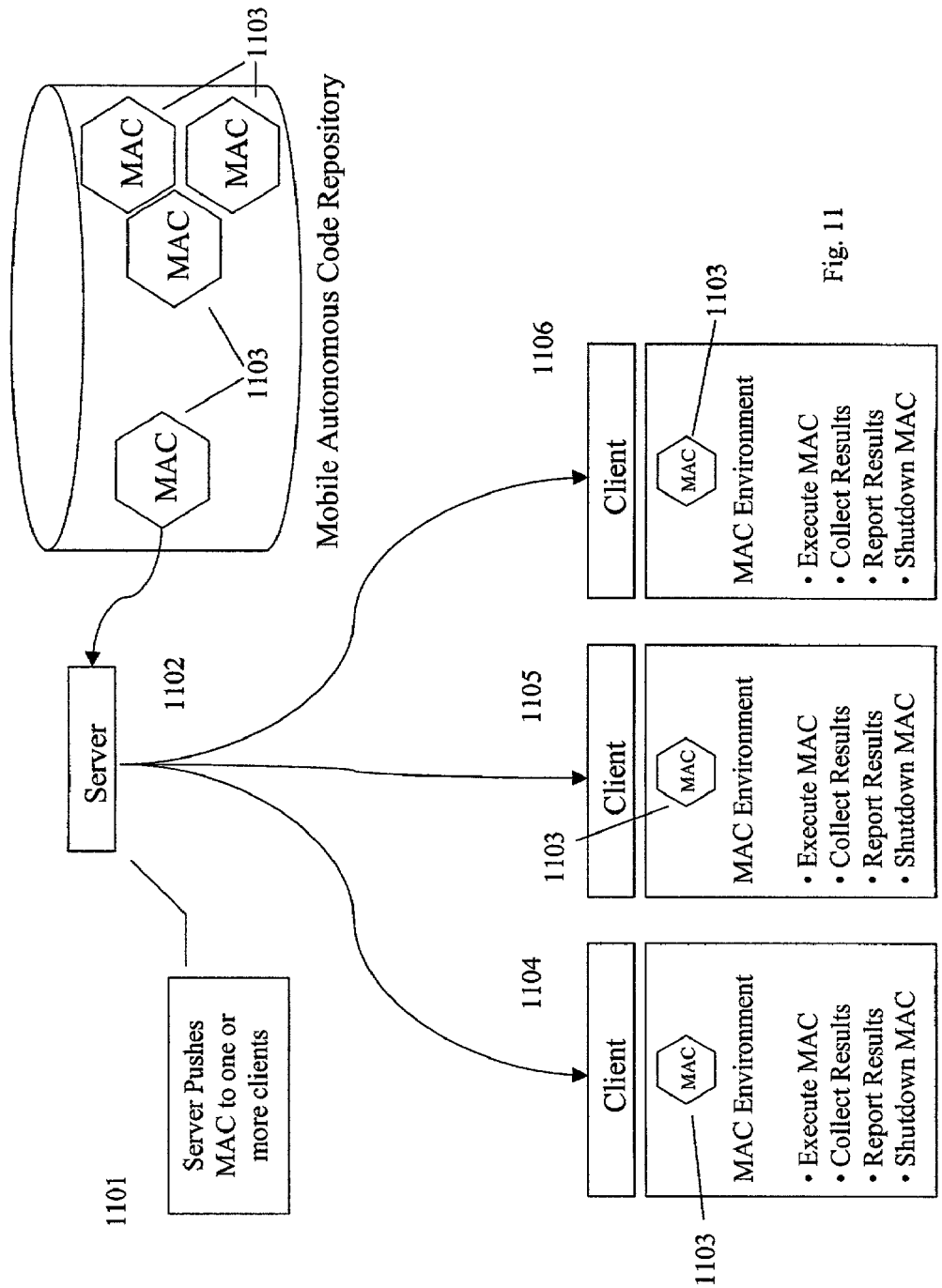
FIG. 11 is a diagram of centralized Mobile Autonomous Code (MAC) Agent distribution.

Turning now to FIG. 11, FIG. 11 shows a diagram of this centralized MAC Agent distribution. In this embodiment, MAC Agents 1103 are designed to be dispatched from the central Server 1102 to the Clients 1104–1106. In this operational mode, the Server 1102 handles all configuration and deployment issues by pushing MAC Agents 1103 to one or more Clients 1101. This configuration allows for the MAC Agents 1103 to be centrally managed and deployed, easily updated from a central console, not subject to alteration or tampering by hostile adversaries and can be dispatched through a predictable or random schedule from a central control point. The central Server 1102 can launch agents to perform Client 1104–1106 operations or operations on the Server 1102 itself, such as monitoring and administrative tasks.

Figure 12:
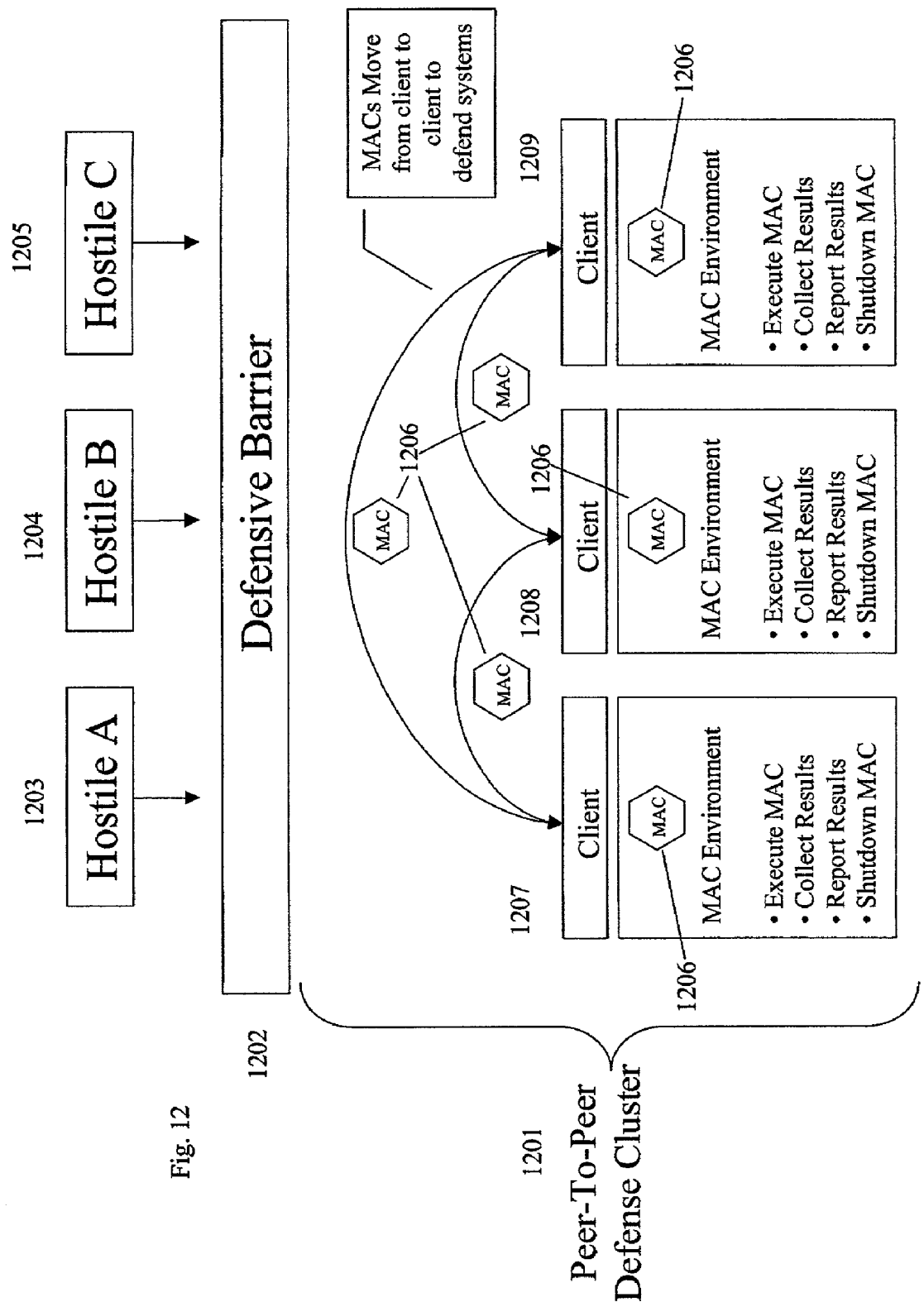
FIG. 12 is a diagram of a Peer-To-Peer Defensive Cluster with MAC Agents.

Turning now to FIG. 12, FIG. 12 shows a diagram of this Peer-To-Peer Defensive Cluster 1201 with MAC Agents 1206. In this embodiment, MAC Agents may travel from client-to-client/peer-to-peer independent of central control. Mobile MAC Agents 1206 can begin patrolling the network immune from centralized attack and can propagate to trouble spots automatically through neighboring hosts. MAC Agents 1206 can be used to form "defense clusters" to form a Defensive Barrier 1202 where neighboring computers work together to defend themselves from concerted hostile attack 1203–1205. In this form of defense, a security policy is enforced using the MAC Agents 1206 along with the extensive reactive capability built into the Client Systems 1207–1209. The MAC Agents 1206 can be used within "defense clusters" to allow groups of computer systems to rapidly defend themselves from attack or failure. MAC Agents 1206 can move from Client to Client 1207–1209, independent of a central controller. MAC Agents 1206 can run on the Client 1207–1209 or on the Server itself for monitoring or administration tasks.

Allowing the use of either centralized or distributed MAC Agents 1103, 1206 on the network allows for modifications of MAC centrally without interrupting system-wide operations. MAC Agents 1103, 1206 cannot be attacked on the host-level in the event of client compromise. MAC Agents 1103, 1206 can be customized to the network environment and only sent to clients that need their services. They can be assigned to patrol the network continuously to look for problems or be dispatched in response to certain events (security, administrative, or other events). They can be utilized to retrieve and process data independent of the client configuration on which they run. MAC Agents 1103, 1206 can move freely between clients with little communication overhead or coordination. They allow client-to-client communication and protection perimeters to be established. This allows the creation of "defense clusters" of systems that work together to protect themselves from attack.

MAC Agents 1103, 1206 can be used in a variety of ways on the network. In one embodiment, they are used to patrol the network looking for security problems. In another embodiment, they can control all aspects of network administration and control alleviating human operators from most aspects of network maintenance.

Besides the used discussed above, MAC Agents 1103, 1206, when used for security, provide an administrator several tactical advantages over an attacker. They are unpredictable and can arrive to remove or detect attackers at random without warning, and may store their code centrally and cannot be tampered with on the client system to bypass security mechanisms. They can be programmed to react to any system security event in real-time that is often significantly faster than a human response. MAC Agents 1103, 1206 can be updated with the latest security-relevant detection strategies without having to alter all clients. MAC Agents 1103, 1206, once alerted to an iintruder'spresence, can begin active searching for attackers and perform automated corrective measures to remove the intruder and save forensic evidence. MAC Agents 1103, 1206 in a peer-to-peer networking environment can propagate through the network absent of centralized control to thwart attack and enable fluid response to network problems. In a peer-to-peer networking environment, they can be introduced by any trusted third party within the network and be made immediately available to all clients.

Figure 13:
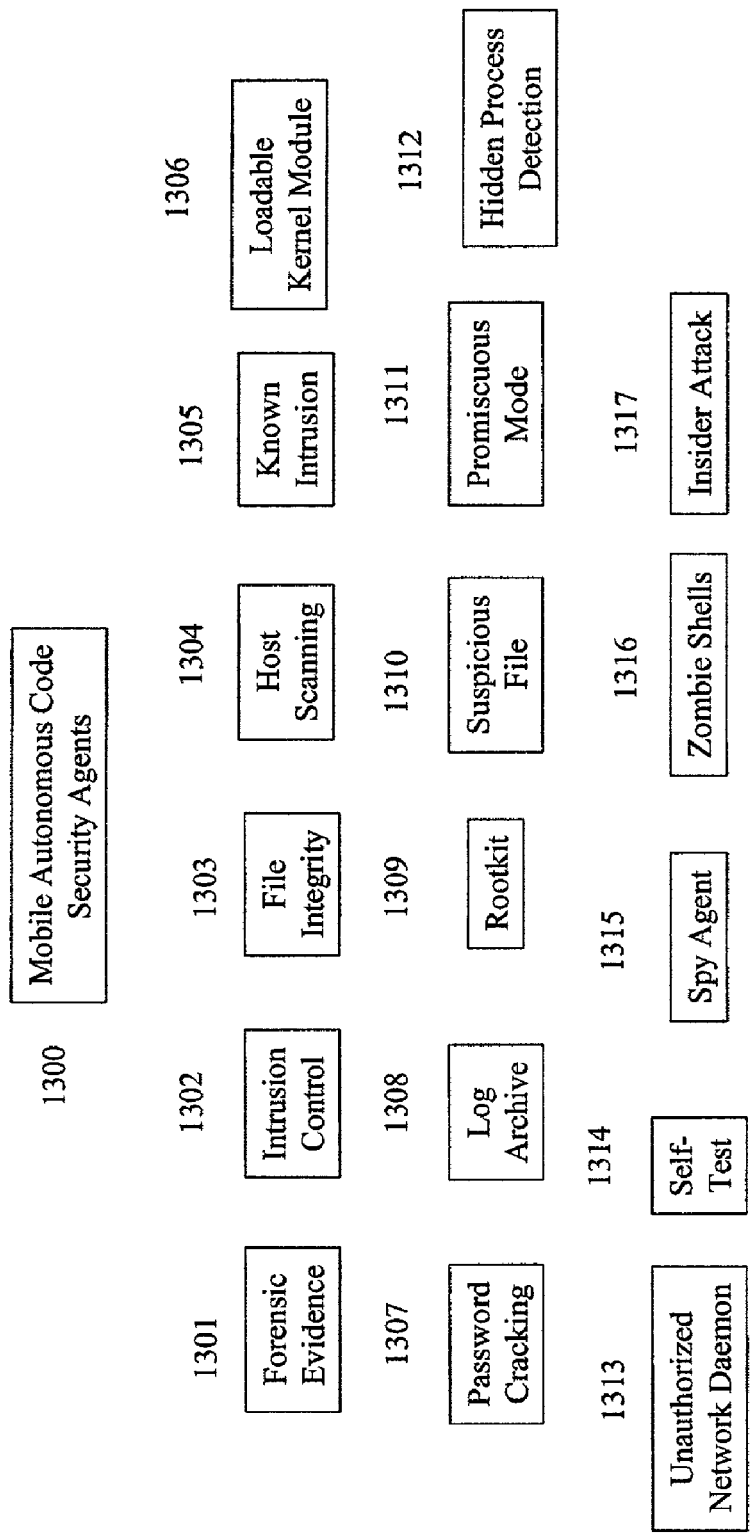
FIG. 13 is a diagram of MAC Agents for security-specific applications.

Turning now to FIG. 13, FIG. 13 is a diagram of MAC Agents for security-specific applications 1300. Description of these applications are given below.

Forensic Evidence Agent 1301 This MAC agent is dispatched to a client system that has been compromised. This agent collects log files, system accounting records, auditing information and tampered files. It also collects other relevant pieces of computer forensic evidence. It protects all collected information and evidence with tamper-resistant cryptographic signatures. It centrally stores all collected evidence for later review by authorized personnel. The Forensic Evidence Agent allows an administrator or law enforcement personnel to re-build how an attack happened and to gather evidence to prosecute attackers.

Intrusion Control Agent 1302 This MAC agent is dispatched in the event of an immediate compromise situation on a host computer system. This agent performs the following at the host system: disabling of the network interfaces to disallow unauthorized traffic except back to the central control platform; shutdown of active user accounts; locating and logging all suspicious activities, files, and processes on the system; notifying the central controller of its actions and request forensic evidence collection; moving between other affected client systems and attempting to contain the intrusion situation.

File Integrity Agent 1303 This agent is designed to use cryptographic secure one-way hashes to detect tampering of system files. This agent can be dispatched from the central server with a list of known good file hashes to compare against on the target system. This list of known good hashes is carried with the MAC itself as part of its package. This mode of operation may allow an attacker to bypass detection if they can access the file hashes stored within the MAC code. The File Integrity Agent 1303 can be dispatched from the central server with only the ability to derive hashes from files with the known-good file hashes residing on the secure server. This mode of operation forces the MAC to communicate back the file hash results, which are then compared by the server to the known good values. This mode of operation prevents certain attacks to the MAC because the known-good hash values are not present on the client. The File Integrity Agent 1303 can be dispatched from the server to audit all system files, randomly select files, or pick from a known set of critical or commonly tampered with files. It can be dispatched from the server at random during the day to thwart attempts at intruders to time scheduled runs to bypass detection. The File Integrity Agent 1303 can look for "suspicious" files or directories on the host that indicate intrusion. Such files or directories typically include those with spaces, hidden characters and control characters in the name and those that are out of place for the target operating system (a plain text file in a Unix device directory, for example) or those with known security exploit scripts (exploit residual information).

Host Scanning Agent 1304—This agent is designed to perform host vulnerability assessment and vulnerability detection from within the host looking outward ("inside out scanning"). This mode of operation is significantly different from other scanners that probe hosts from the network. This feature is accurate for detecting problems because the scanner has privileged access to the host internally and can automatically look for misconfigurations with certainty instead of having to make assumptions the way a network based scanner does. The scanner can spot local host vulnerabilities that aren't visible from the network that may allow for exploitation internally. The scanner can be updated from a central server location with optimized scanning data designed for the host-platform it is running on. This allows for faster operation. The scanner can search for known signs of intrusion that are often hidden from network scanners. The scanner does not consume network bandwidth when inspecting large number of hosts. This allows it to operate efficiently even in limited-bandwidth or remote deployment environments. The scanner can condense its findings at the host before sending to the server to conserve CPU time when generating reports and optimizing gathering of information across the network. The host scanning agent has several built in detection features which include a database of known vulnerable files for the platform it is scanning; an expert system for detecting common erroneous or corrupted configurations on the host; generic detection mechanisms for common problems that may cause vulnerabilities within the host; and the ability to detect suspicious files and activity on a host that may indicate a compromise has taken place.

Known Intrusion Agent 1305 This agent is designed with signatures specifically to look for and alarm on signs of known intrusion. This agent is designed to randomly roam the network and detect this activity before it becomes widespread. Upon detection it notifies the central server that can then dispatch Intrusion Control Agents, Forensic Evidence Agents, or other MAC Agents to assess and respond to the incursion. The signatures that this agent rely upon are varied depending on the type of attack, but they can include: known Trojan horse detection; common backdoors; common binary alterations; suspicious directories which are known hiding places for attackers; suspicious files, for example files with known suspicious filenames indicating a break-in attempt or success; tampered system critical files; suspicious loadable kernel modules; suspicious running operating system modifications; suspicious usernames; known suspicious usernames; usernames that were not present on the system last time it was scanned; usernames that are not authorized to be present on the system regardless of last time scanned; altered or missing log files; altered or missing accounting records; and other suspicious activity as specified in the accompanying database with the agent.

Loadable Kernel Module Agent 1306—This agent looks for known or unknown loadable kernel modules (LKMs) for UNIX® compatible systems. Modified LKMs are a common method used by attackers to conceal activity on compromised systems. This agent looks for the following: unauthorized LKMs loaded; known suspicious LKMs loaded; unknown suspicious LKMs loaded; intercepting system calls; employing protective anti-probe or stealth techniques; accessing or hooking normally restricted data areas in memory or on disk; and other suspicious activity.

Password Cracking Agent 1307—This agent attempts to break user passwords using a list of common, uncommon or customized words. This mechanism helps spot weak passwords before intruders can abuse them. This agent can travel from host to host attempting to break and report on bad passwords to the central controller. It can also travel from host to host attempting to break passwords given to it by the central controller to distribute cracking efforts over all the computers on the network.

Log Archive Agent 1308—This agent is responsible for archiving, cryptographically signing, and saving all relevant system logs, accounting records, and other audit data from the target host on which it is executing. This information is pulled back to the main server for archival purposes. This agent exists to help track down security or maintenance issues across the enterprise. This agent ensures that critical audit data is stored in a centrally managed repository that is not susceptible to tampering the way it would be if it were only present on the target host. Audit data collected by this agent can be historically categorized on the back-end server where data-mining and other advanced data correlation techniques can be used to detect and monitor trends for security or other problems.

"otkit" Agent 1309 This is a complement to the Known Intrusion Agent and is designed to specifically look for all variants of "rrotkits" that may be on the target host. "RRotkits" areus ed by intruders to automatically conceal activity, install backdoors, and create Trojan horse binaries to fully compromise a system. This agent is capable of detecting all major categories and derivatives of "rrotkits" inexistence.

Suspicious File Agent 1310—This agent is designed to look for known or user-specified banned files on client systems. Upon detection of these file this agent can erase, archive, send an alarm, or perform other action as specified. Examples of suspicious files include pirated MP3 music files; pirated software; pornography or other inappropriate data; confidential corporate data outside of controlled spaces; user-specified files or data; and core files from prominent running system daemons that could be the result of a buffer overflow attack Promiscuous Mode Agent 1311 This agent detects network cards in promiscuous modes on remote clients. This is a random audit capability.

Hidden Process Detection Agent 1312—This agent can detect hidden processes on the remote host.

Unauthorized Network Daemon Agent 1313 Looks for network daemons being run by unauthorized users.

Self-Test Agent 1314 Agents that can simulate attacks on the host to test the IDS functions independently.

Spy Agent 1315 This agent follows around users to observe their activity if it is suspicious or if they have been tagged for surveillance.

Zombie Shells Agent 1316 This agent will attempt to detect zombie shells left over from buffer overflow attacks.

Insider Attack Agent 1317 This agent will be dispatched to the attacking host if both the host being attacked and the attacker are under the system control. This agent is used to stop the insider attack at the host in case it is being used as a hop point to move around inside.

Figure 14:
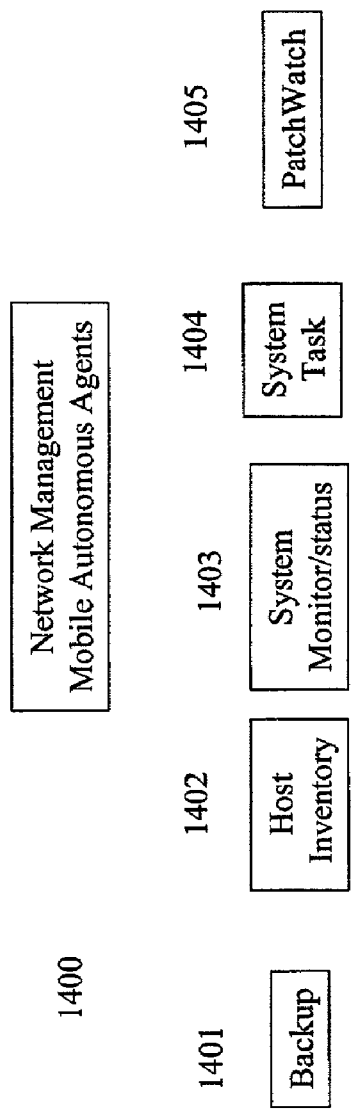
FIG. 14 is a diagram of MAC Agents for network management-specific applications.

Turning now to FIG. 14, FIG. 14 is a diagram of MAC Agents for network management-specific applications 1400. Descriptions of these application are given below.

Backup Agent 1401 This agent is designed to perform a full or partial backup of the client system depending on its configuration. Applications for this include: automated scheduled backup of systems to a central storage facility and automated response backup upon detection of a system fault to preserve critical data (such as a bad hard drive being detected).

Host inventory agent 1402—This agent performs a detailed hardware inventory of the target system noting such data as: system type; CPU Type; memory capacity; operating system installed; software versions installed; storage capacity; serial numbers; and user-specified. This data is retrieved and stored at the central server repository for cataloging systems on the network for use by other agents, data-mining needs, central reporting, tracking of installed patches, or other purposes.

System monitor/status agent 1403—This agent reports on the system status of the client on which it is executing. This data may include amount of free storage available; number of active users; network activity; CPU activity; and other relevant system data as defined by the user.

System task agent 1404 This agent can perform a variety of system maintenance related tasks as configured by the administrator. Such tasks may include: removing files from temp directories; freeing up drive space by removing unused files and directories; and running any other user-specified action on the target systems PPachWatch☐ agent 1405 This agent is designed to detect what operating system a remote host is running. Once this data is collected it is deposited into the central repository. The central server then will utilize a subscription-based monitoring service that reports on a daily basis what new security patches have become available from all known vendors. The PatchWatch service then downloads the patch and uses the PatchWatch agents to distribute the security or administrative patch information to affected hosts automatically. This service allows administrators to keep systems up-to-date with minimal downtime and involvement. PatchWatch inventories host systems automatically. The central PatchWatch server monitors vendor sites for new product updates, patches, or hot fixes. The central PatchWatch server downloads the newest updates. The updates are categorized and pushed down to affected clients automatically to repair the problem.

Using the foregoing, the invention may be implemented using standard programming or engineering techniques including computer programming software, firmware, hardware or any combination or subset thereof. Any such resulting program, having a computer readable program code means, may be embodied or provided within one or more computer readable or usable media, thereby making a computer program product, i. e. an article of manufacture, according to the invention. The computer readable media may be, for instance a fixed (hard) drive, disk, diskette, optical disk, magnetic tape, semiconductor memory such as read-only memory (ROM), or any transmitting/receiving medium such as the Internet or other communication network or link. The article of manufacture containing the computer programming code may be made and/or used by executing the code directly from one medium, by copying the code from one medium to another medium, or by transmitting the code over a network.

An apparatus for making, using or selling the invention may be one or more processing systems including, but not limited to, a central processing unit (CPU), memory, storage devices, communication links, communication devices, server, I/O devices, or any sub-components or individual parts of one or more processing systems, including software, firmware, hardware or any combination or subset thereof, which embody the invention as set forth in the claims.

User input may be received from the keyboard, mouse, pen, voice, touch screen, or any other means by which a human can input data to a computer, including through other programs such as application programs.

Although the present invention has been described in detail with reference to certain preferred embodiments, it should be apparent that modifications and adaptations to those embodiments may occur to persons skilled in the art without departing from the spirit and scope of the present invention as set forth in the following claims.

The invention claimed is:

1. A computer implemented method for providing system security and resource management, comprising:
    managing event messages by a master control processor between system handlers according to security system policies;
    processing network messages by a network handler between client and server computers;
    inserting native and third party event messages received by an insertion handler into the master control processor for processing by other system handlers;
    detecting and processing event message signatures by a signature handler from alarm, system, and insertion events for conversion into system alarm messages for action by the other system handlers; and
    performing actions by an action handler in response to action requests generated by the other system handlers and received from the master control processor, wherein the master control processor routes messages to and from the system handlers without being involved in security and resource management functions distributed among the system handlers.

2. The method according to claim 1, further comprising maintaining an execution environment by an agent handler for mobile autonomous code modules.

3. The method according to claim 1, further comprising collecting and logging event messages by a logging handler.

4. The method according to claim 1, further comprising managing system configuration parameters by a configuration handler.

5. The method according to claim 1, wherein the step of managing event messages comprises:
    registering the system handlers;
    passing event messages between system handlers; and
    managing an event queue attached to the system handlers.

6. The method according to claim 5, wherein the step of registering each system handler comprises:
    reading a module of the system handler to determine initialization requirement;
    initializing an application programming interface of the system handler;
    determining if the system handler is to run as a remote procedure call;
    making the system handler available through an interface of the remote procedure call if run as the remote procedure call; and
    initializing input/output queues of the system handler if not run as the remote procedure call.

7. The method according to claim 1, wherein the system handlers comprise static and dynamic system processes.

8. The method according to claim 1, further comprising;
    initiating the system handlers by internal mechanisms;
    initiating the system handlers by external mechanisms; and
    initiating the system handlers from the master control processor.

9. The method according to claim 1, further comprising operating the system handlers in either a client or server computer mode.

10. The method according to claim 1, wherein the step of processing network messages by the network handler comprises:
    allowing connection only from clients and servers defined in an access control list;
    authenticating protocols with clients and servers;
    compressing data to minimize bandwidth requirements; and
    encrypting data to provide secure communication.

11. The method according to claim 1, wherein the step of inserting native and third party event messages received by the insertion handler from external programs comprises:

reading and writing messages using an insertion method selected from a group consisting of file descriptor, network sockets and named pipe;

using a native insertion mode library to directly insert messages into the master control processor; and using an external insertion mode library linked to a third party source to directly insert messages into the master control processor.

12. The method according to claim 1, wherein the step of detecting and processing event messages received by the signature handler comprises:

accepting alarm events from the master control processor;

decoding an alarm type and originator from the alarm event;

consulting internal signature registry for alarms of the type accepted;

handing the alarm message off to a signature module for processing;

extracting alarm data macro information;

determining if an alarm has occurred;

consulting the action policy if an alarm has occurred to determine response; and passing the resulting response message to the master control processor for action by the other system handlers.

13. The method according to claim 1, wherein the action performed by the action handler is selected from a group consisting of blocking a host with a modified route command, blocking a host with a packet filter modification command, disabling a user account, disabling a network interface, running an external user-defined command, logging an event, sending email or pager alerts, sending on-screen alerts to users or administrators, requesting server executed action, and a pluggable action defined by a user.

14. The method according to claim 1, wherein the steps of detecting and processing event messages received by the signature handler and performing actions by the action handler comprises the steps of:

receiving an event message containing a signature by the signature handler from the master control processor;

detecting an attack by the signature handler from the event message signature;

consulting action policy by the signature handler;

determining action to be taken by the signature handler;

ending the processing if no action is required;

determining required action parameters by the signature handler if action is required;

sending an action request to the action handler by the signature handler via the master control processor;

processing and executing the action request by the action handler; and returning status of the executed action to the signature handler.

15. The method according to claim 2, wherein the step of maintaining an execution environment by the agent handler for mobile autonomous code modules comprises:

ensuring that the mobile autonomous code modules carry appropriate credentials, are authenticated and cryptographically signed by a trusted introducer, and able to execute on the host operating system;

distributing mobile autonomous code modules to one or more client computers;

executing the mobile autonomous code modules without interference;

allowing the mobile autonomous code modules to collect and report its results; and shutting down the mobile autonomous code modules.

16. The method according to claim 15, wherein the step of executing the mobile autonomous code modules comprises:

verifying detected alarms;

reducing false alarm rates; and providing immediate response.

17. The method according to claim 15, wherein the step of executing the mobile autonomous code modules comprises the steps of actively looking for problems and identifying attackers when problems are detected.

18. The method according to claim 15, wherein the step of executing the mobile autonomous code modules comprises performing security and system administration tasks in self-healing network environments.

19. The method according to claim 15, wherein the step of executing the mobile autonomous code modules comprises allowing self-healing components to move between clients and operate independently where required.

20. The method according to claim 2, wherein the step of maintaining an execution environment by the agent handler for mobile autonomous code modules comprises:

enabling self-healing and adaptive networks;

facilitating distribution of updates for the mobile autonomous code modules; and centralizing command and control functions for increased reliability.

21. The method according to claim 2, wherein the step of maintaining an execution environment by the agent handler further comprises forming a peer-to-peer defensive cluster with mobile autonomous code modules.

22. The method according to claim 2, wherein the step of maintaining an execution environment by the agent handler further comprises protecting the mobile autonomous code modules from alteration or tampering by hostile adversaries, and dispatching the mobile autonomous code modules through a predictable schedule from a central control point.

23. The method of claim 22, wherein the mobile autonomous code modules are dispatched through a random schedule.

24. The method according to claim 2, wherein the step of maintaining an execution environment by the agent handler further comprises:

programming the mobile autonomous code modules to detect and remove attackers at random;

storing code for the mobile autonomous code modules at a central location;

preventing alteration of the mobile autonomous code modules on client computers;

updating the mobile autonomous code modules with updated security detection strategies without modifying client computers;

beginning an active search for attackers when alerted to an intruder's presence;

performing automated corrective measures to remove the intruder; and saving forensic evidence.

25. The method according to claim 2, wherein security-specific mobile autonomous code modules are selected from a group consisting of forensic evidence agent, intrusion control agent, file integrity agent, host scanning agent, known intrusion agent, loadable kernel module agent, password cracking agent, log archive agent, rootkit agent, suspicious file agent, promiscuous mode agent, hidden process detection agent, unauthorized network daemon agent, self-test agent, spy agent, zombie shells agent, and insider attack agent.

26. The method according to claim 25, wherein forensic evidence gathered by the forensic evidence agent from protected systems is cryptographically signed to prevent tampering.

27. The method according to claim 2, wherein network management-specific mobile autonomous code modules are selected from a group consisting of backup agent, host inventory agent, system monitor and status agent, system task agent, and PPatchWatch™ agent.

28. The method according to claim 3, wherein the method of logging event messages is selected from a group consisting of text-based files, a local system auditing facility, a cryptographically signed secure log format, directly to a system console, e-mail notification, direct used interface, and system wide notification.

29. The method according to claim 4, wherein the step of managing system configuration parameters comprises;
   interfacing generic calls to other system handlers;
   reading system configuration parameters;
   writing system configuration parameters;
   changing system configuration parameters;
   reverting system configuration parameters back to a previous version;
   deleting system configuration parameters;
   backing up system configuration parameters; and
   providing multiple access protection mechanisms.

30. A system for providing system security and resource management, comprising:
   a master control processor for managing event messages between system handlers according to security system policies;
   a network handler for processing network messages between client and server computers;
   an insertion handler for inserting native and third party event messages into the master control processor for processing by other system handlers;
   a signature handler for detecting and processing event messages from alarm, system, and insertion events for conversion into system alarm messages for action by other system handlers; and
   an action handler for performing actions in response to action requests from the master control processor, wherein the master control processor routes messages to and from the system handlers without being involved in security and resource management functions distributed among the system handlers.

31. The system according to claim 30, further comprising:
   an agent handler for maintaining an execution environment for mobile autonomous code modules;
   a logging handler for collecting and logging event messages; and
   a configuration handler for managing system configuration parameters.

32. The system according to claim 31, wherein the system handlers are operable to auto-register themselves and their capabilities with the master control processor.

33. The system according to claim 30, wherein the action handler utilizes pluggable action modules.

34. The system according to claim 30, wherein the signature handler utilizes pluggable signature modules.

35. The system according to claim 34, wherein the pluggable signature modules are operable to auto-register with the signature handler.

36. The system according to claim 34, wherein the pluggable signature modules are operable to use stored data from other signature modules, operable to store data between execution, operable to store data between system startup and shutdown sequences, and operable to only process signatures relating to the pluggable signature module.

37. The system according to claim 34, wherein the pluggable signature modules are added and removed from the system without modifying the core system code.

38. The system according to claim 31, wherein the system is installed on at least one server computer and at least one client computer.

39. The system according to claim 38, wherein the system is installed on at least one client computer and is configured to operate independently of the system installed on at least one server computer for reduced processing and reaction time and when network communications are disrupted.

40. The system according to claim 38, further comprising at least one graphical user interface.

41. The system according to claim 40, further comprising multiple levels of independent alarm filters on the client and server computers for reduced false alarm reporting, configuration flexibility, and system granularity.

42. The system according to claim 40, further comprising encrypted and mutually authenticated communication links between the server computer, client computer and graphical user interface.

43. The system according to claim 40, further comprising a means for re-allocating system resources to circumvent system problems or failures.

44. The system according to claim 31, wherein the system is installed on a client computer and includes means operable to maintain host processes, collect and forward events, process local client signatures, generate events, initiate and respond to action requests, initiate self-healing counter-measures, and host mobile autonomous code agents.

45. The system according to claim 31, wherein the system is installed on a server computer and includes means operable to collect and store events, process enterprise client signatures, generate events, operate a central system database, schedule events, initiate and respond to action requests, initiate self-healing counter-measures, maintain a graphical user interface backend structure, and manage mobile autonomous code agents.

46. The system according to claim 40, wherein the client computer has a capability to perform server computer functions in the event of failure of a server computer.

47. The system according to claim 40, wherein the server computer has a capability to perform client computer functions in the event of failure of a client computer.

48. Computer executable software code stored on a computer readable medium, the code for a computer implemented method for providing system security and resource management, comprising:
   code for managing event messages by a master control processor between system handlers according to security system policies;
   code for processing network messages by a network handler between client and server computers;
   code for inserting native and third party event messages received by an insertion handler into the master control processor for processing by other system handlers;
   code for detecting and processing event message signatures by the signature handler from alarm, system, and insertion events for conversion into system alarm messages for action by the other system handlers; and
   code for performing actions by an action handler in response to action requests from the master control processor, wherein the master control processor routes messages to and from the system handlers without being involved in security and resource management functions distributed among the system handlers.

49. The computer executable software code method of claim 48, further comprising:

code for maintaining an execution environment by an agent handler for mobile autonomous code modules;

code for collecting and logging event messages by a logging handler; and code for managing system configuration parameters by a configuration handler.

* * * * *